US012664093B2

(12) United States Patent
Dechene et al.

(10) Patent No.: US 12,664,093 B2
(45) Date of Patent: Jun. 23, 2026

(54) SCHEDULING MERGED STORE OPERATIONS IN COMPLIANCE WITH STORE ORDERING RULES

(71) Applicant: Intel Corporation, Santa Clara, CA (US)

(72) Inventors: Mark Dechene, Hillsboro, OR (US); Ryan Carlson, Hillsboro, OR (US); Ricardo Daniel Queiros Alves, Portland, OR (US); Yan Zeng, Portland, OR (US); Richard Klass, Hillsboro, OR (US); Brendan West, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/876,081

(22) Filed: Jul. 28, 2022

(65) Prior Publication Data

US 2024/0037036 A1  Feb. 1, 2024

(51) Int. Cl.
*G06F 12/08* (2016.01)
*G06F 12/0815* (2016.01)
*G06F 12/0864* (2016.01)

(52) U.S. Cl.
CPC ...... *G06F 12/0815* (2013.01); *G06F 12/0864* (2013.01); *G06F 2212/1021* (2013.01)

(58) Field of Classification Search
CPC ............. G06F 12/0815; G06F 12/0864; G06F 2212/1021; G06F 9/3834; G06F 12/0813; G06F 12/0857; G06F 12/0895; G06F 2212/507; G06F 12/0846; G06F 12/0811
See application file for complete search history.

(56) References Cited

U.S. PATENT DOCUMENTS

2017/0123795 A1*  5/2017  Chen ..................... G06F 9/3824
2018/0349280 A1*  12/2018  Prasad .................. G06F 12/128
2023/0017802 A1*  1/2023  Abhishek Raja ..... G06F 9/3834

* cited by examiner

*Primary Examiner* — Masud K Khan
(74) *Attorney, Agent, or Firm* — Nicholson De Vos Webster & Elliott LLP

(57) ABSTRACT

Techniques for scheduling merged store operations are described. In an embodiment, an apparatus includes a data cache; a fill buffer; a store buffer to store first information associated with a first retired store operation and second information associated with a second retired store operation; a store coalescing buffer (SCB) to receive the first information from the store buffer, to store the first information in an SCB entry, to merge the second information from the store buffer into the entry, and to provide data associated with the entry for a write to the data cache or the fill buffer; and a global store scheduler (GSS) to schedule the write relative to an other write from an other SCB in compliance with one or more store ordering rules.

17 Claims, 13 Drawing Sheets

400

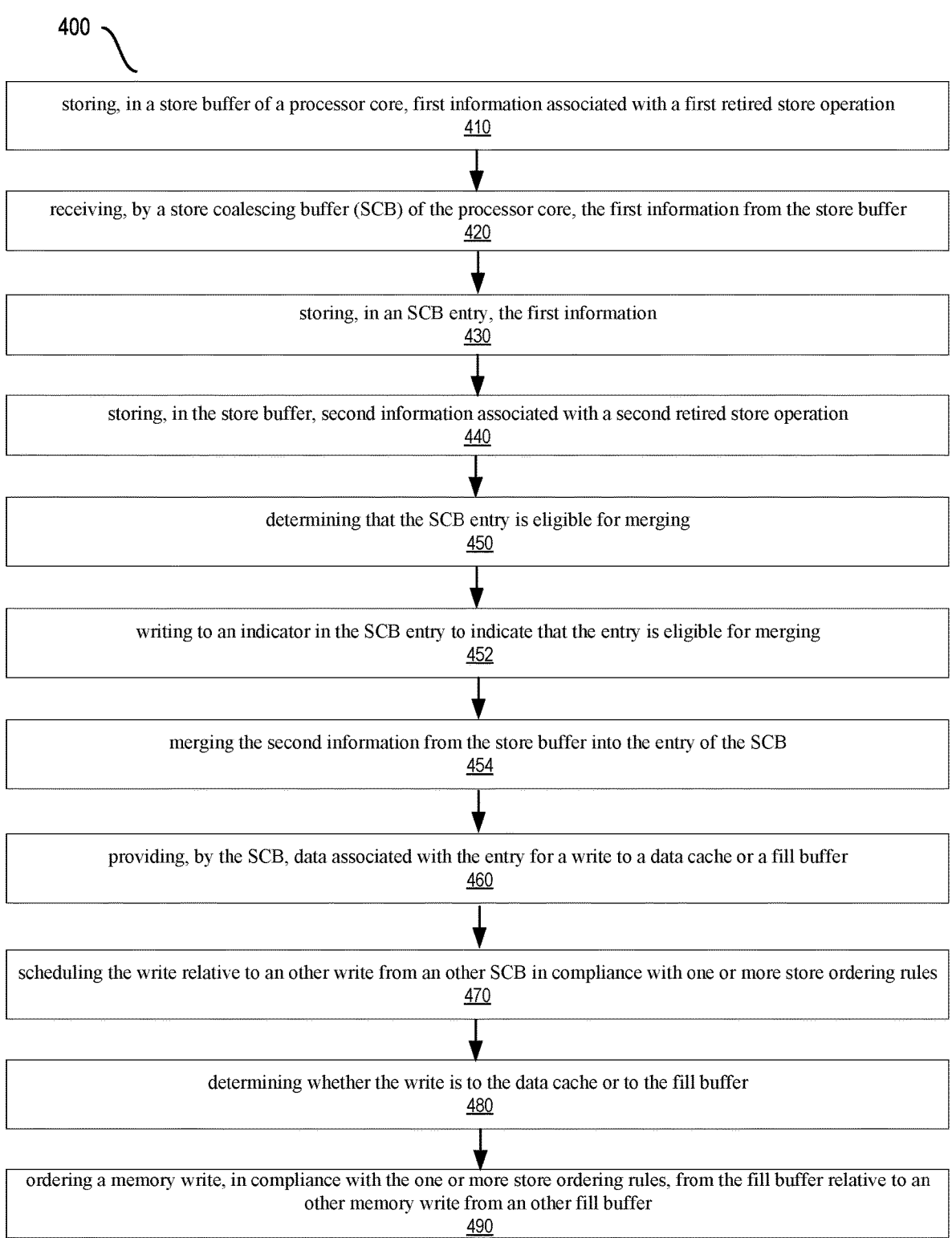

storing, in a store buffer of a processor core, first information associated with a first retired store operation
410 receiving, by a store coalescing buffer (SCB) of the processor core, the first information from the store buffer
420 storing, in an SCB entry, the first information
430 storing, in the store buffer, second information associated with a second retired store operation
440 determining that the SCB entry is eligible for merging
450 writing to an indicator in the SCB entry to indicate that the entry is eligible for merging
452 merging the second information from the store buffer into the entry of the SCB
454 providing, by the SCB, data associated with the entry for a write to a data cache or a fill buffer
460 scheduling the write relative to an other write from an other SCB in compliance with one or more store ordering rules
470 determining whether the write is to the data cache or to the fill buffer
480 ordering a memory write, in compliance with the one or more store ordering rules, from the fill buffer relative to an other memory write from an other fill buffer
490

FIG. 4

PROCESSOR OR SOC 600

SCHEDULING MERGED STORE OPERATIONS IN COMPLIANCE WITH STORE ORDERING RULES

BACKGROUND

An information processing system may include one or more memories in which to store data, instructions, and/or other information. A processor core in an information processing system may include circuitry to perform operations to store data, instructions, and/or other information in the one or more memories.

BRIEF DESCRIPTION OF THE DRAWINGS

Various embodiments in accordance with the present disclosure will be described with reference to the drawings, in which:

FIG. 4 illustrates a method of scheduling merged store operation according to embodiments.

DETAILED DESCRIPTION

The present disclosure relates to methods, apparatus, systems, and non-transitory computer-readable storage media for storing data, instructions, and/or other information in one or more memories of an information processing system.

As mentioned in the background section, a processor in an information processing system or other electronic product may include circuitry and/or other hardware or structures to perform operations to store data, instructions, and/or other information in one or more memories. The use of embodiments may provide for performing one or more of these operations faster and/or more efficiently and/or otherwise provide for faster execution of software, higher overall performance, and/or lower power consumption.

While various features are described in the context of the below example core organization, alternative embodiments may implement such features in other example core organizations.

Figure 1:
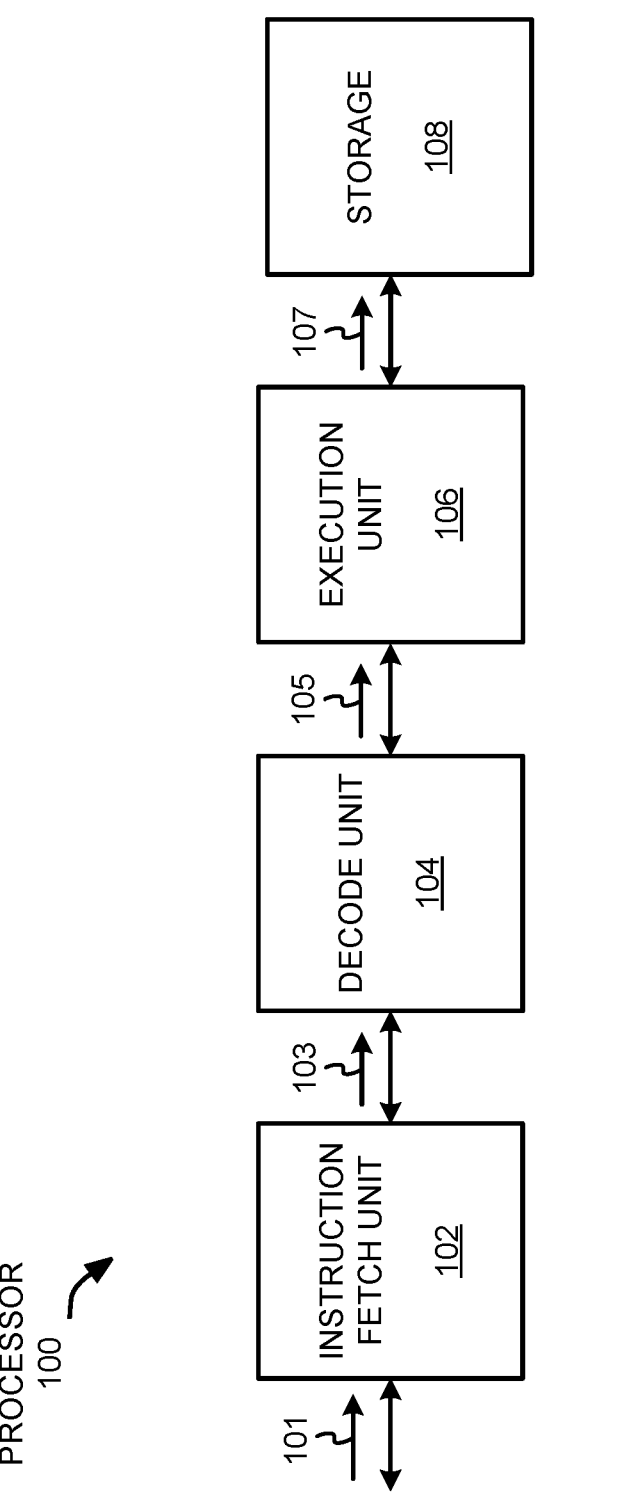
FIG. 1 is a block diagram of a processor core in which embodiments may be implemented.

FIG. 1 is a block diagram of an embodiment of a processor core 100 in which some embodiments may be implemented. In some embodiments, the processor core may be implemented for or in a general-purpose processor (e.g., a central processing unit (CPU) or other general-purpose microprocessor of the type used in servers, desktop, laptop, smart phones, or other computers). Alternatively, the processor core may be implemented for or in a special-purpose processor. Examples of suitable special-purpose processors include, but are not limited to, network processors, communications processors, graphics processors, co-processors, digital signal processors (DSPs), embedded processors, and controllers (e.g., microcontrollers). The processor and/or processor core may be disposed on a semiconductor die or integrated circuit and may include hardware (e.g., transistors, circuitry, etc.). As examples, processor core 100 in FIG. 1 may correspond to any core within processor 570 or 580 in FIG. 5, any of cores 602A to 602N in FIG. 6, and/or core 790 in FIG. 7.

The processor core 100 has an instruction fetch unit 102, a decode unit 104, an execution unit 106, and storage 108. The instruction fetch unit or fetch unit may fetch instructions 101. The instructions 101 may represent macroinstructions, instructions of an instruction set of the processor, instructions that the decode unit 104 is able to decode, or the like. The fetch unit 102 may be coupled to receive the instructions 101 from on-die storage (not shown) of the processor, such as, for example, one or more caches, buffers, queues, or the like, and/or from system memory. The decode unit 104 is coupled with the fetch unit 102 to receive the fetched instructions 103 (e.g., the same instructions but reordered), and may be operable to decode the fetched instructions 103 into one or more relatively lower-level instructions or control signals 105 (e.g., one or more microinstructions, micro-operations (uops), micro-code entry points, decoded instructions, or control signals, etc.).

Together, fetch unit 102 and decode unit 104, possible along with a branch prediction unit, a microcode sequencing unit, and/or other circuitry or units, may be referred to as a front-end.

Execution unit 106 may represent one or more execution units coupled with the decode unit to receive the one or more lower-level instructions or control signals 105 and may be operable to generate corresponding results 107. The results 107 may be stored in on-die storage 108 of the processor (e.g., registers, caches, etc.) or in off-die storage (e.g., system memory).

In embodiments, a multi-level cache hierarchy includes level 0 (L0) caches, a physically and/or logically partitioned level 1 (L1) cache, and a physically and/or logically partitioned level 2 (L2) cache, and core 100 shares a level 3 (L3) cache or last-level cache (LLC) with other cores of a multicore processor. An L0 data cache to store data and an L0 instruction cache to store instructions may be included in execution unit 106 to improve data/instruction access speed. In embodiments, the various components of the core, including the execution unit 106, are coupled to the L1 cache via a crossbar which supports multiple non-interfering connections with the L1 cache.

To avoid obscuring the description, a relatively simple processor core 100 has been shown and described. In embodiments, a processor core may include multiple decode units, multiple execution units, and so on, and/or the processor core may optionally include other processor components, such as those shown and described below for any of FIGS. 2A, 2B, 2C, 3A, 3B, 7B, and 8.

In embodiments, core 100 may have several execution units 106, which may also be referred to as an execution block or box (note that a "unit," "block," or "box," in this context, typically refers to circuitry, however, in some embodiments, may refer to a combination of hardware circuitry and software). In some embodiments, at least one of the execution units is a memory execution unit (MEM unit, MEM box, or MEM). In embodiments, a MEM unit may process memory requests and page translation requests from the front-end; may process and/or perform load and store operations, returning results and final status (complete/fault) to an out-of-order (OOO) cluster for subsequent instructions and instruction retire; and/or may receive non-core snoops and ensure that correct coherence actions are taken in the core.

In some embodiments, a MEM unit may be subdivided into five distinct sub-units, parts, or parcels: L0 MEM, L1 MEM, L2 MEM, page miss handler (PMH), and prefetchers. In embodiments, L0 MEM is the smallest, fastest unit of memory; L1 MEM is an L1 memory unit with large caches and buffers to support loads and stores with moderate latency; L2 MEM is an L2 memory unit to provide access to an L2 cache and to serve as an interface to the rest of the system (which may be a system-on-chip or SoC); the PMH services page translation misses on behalf of L1 translation lookaside buffers (TLBs), translating linear addresses into physical addresses and producing TLB entries to fill L1 TLBs; and the prefetchers include hardware prefetchers to till cache lines in caches (e.g., L1 data cache, L2 cache) ahead of predicted demand.

The MEM may also be divided internally into clusters in some places (e.g., L0 MEM) and into slices in other places (e.g., L1 MEM and L2 MEM). Clusters divide the instruction stream into medium-sized groups of contiguous instructions called strands, and then one or more strands may be executing on a cluster at a time. Clusters may be most effective when executing work that is adjacent in program order to other work. Slices divide the memory instruction stream based upon the addresses the instructions access. Slices may create an inherent proof that certain memory instructions may mostly ignore other instructions, and therefore reduce ordering and correctness checks, when different memory instructions have been assigned to different slices. Slices may be most effective when the memory address pattern is relatively balanced across cachelines.

To transition between the cluster domain and the slice domain, memory operations traverse a crossbar. Travelling from the slice domain to the cluster domain also traverses through the crossbar.

Embodiments may be implemented in a MEM unit, load/store unit, or elsewhere in a core, processor, and/or system. An example embodiment in a MEM unit is described in connection with FIGS. 2A, 2B, 2C, 3A, and 3B.

Figure 2A:
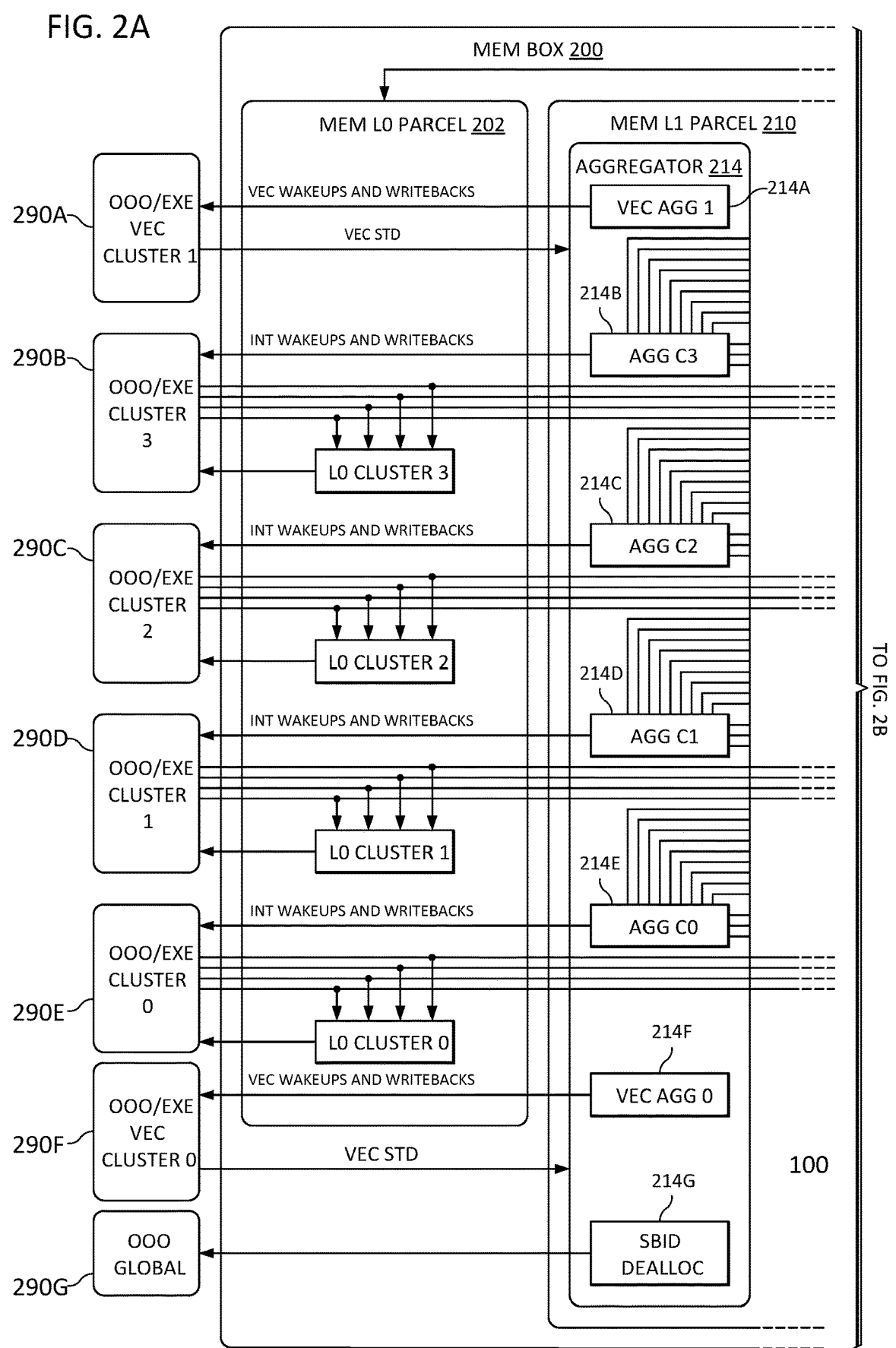
FIGS. 2A, 2B, and 2C are a block diagram of a memory execution unit according to embodiments.
Figure 2B:
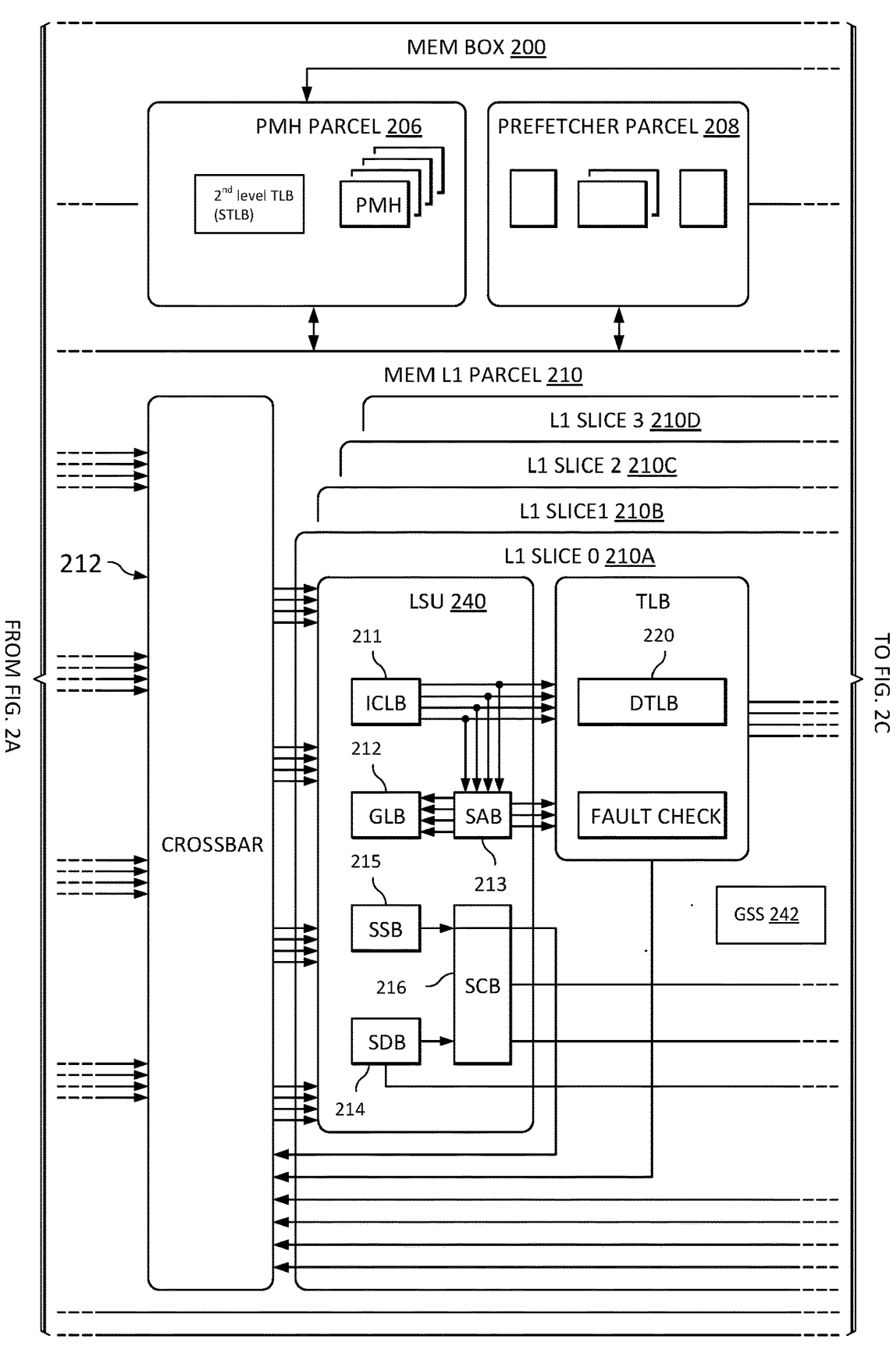
Figure 2C:
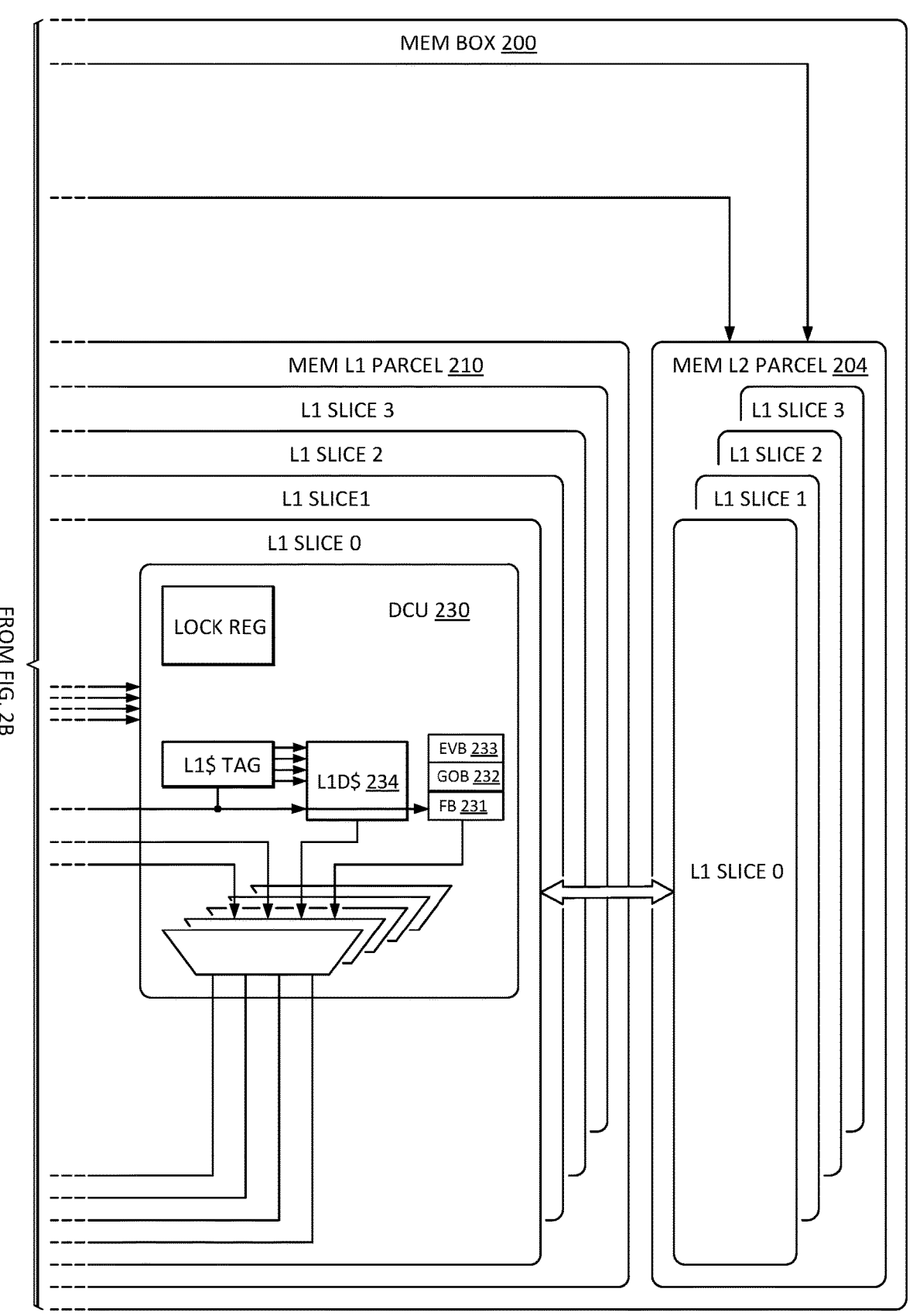
Figure 3A:
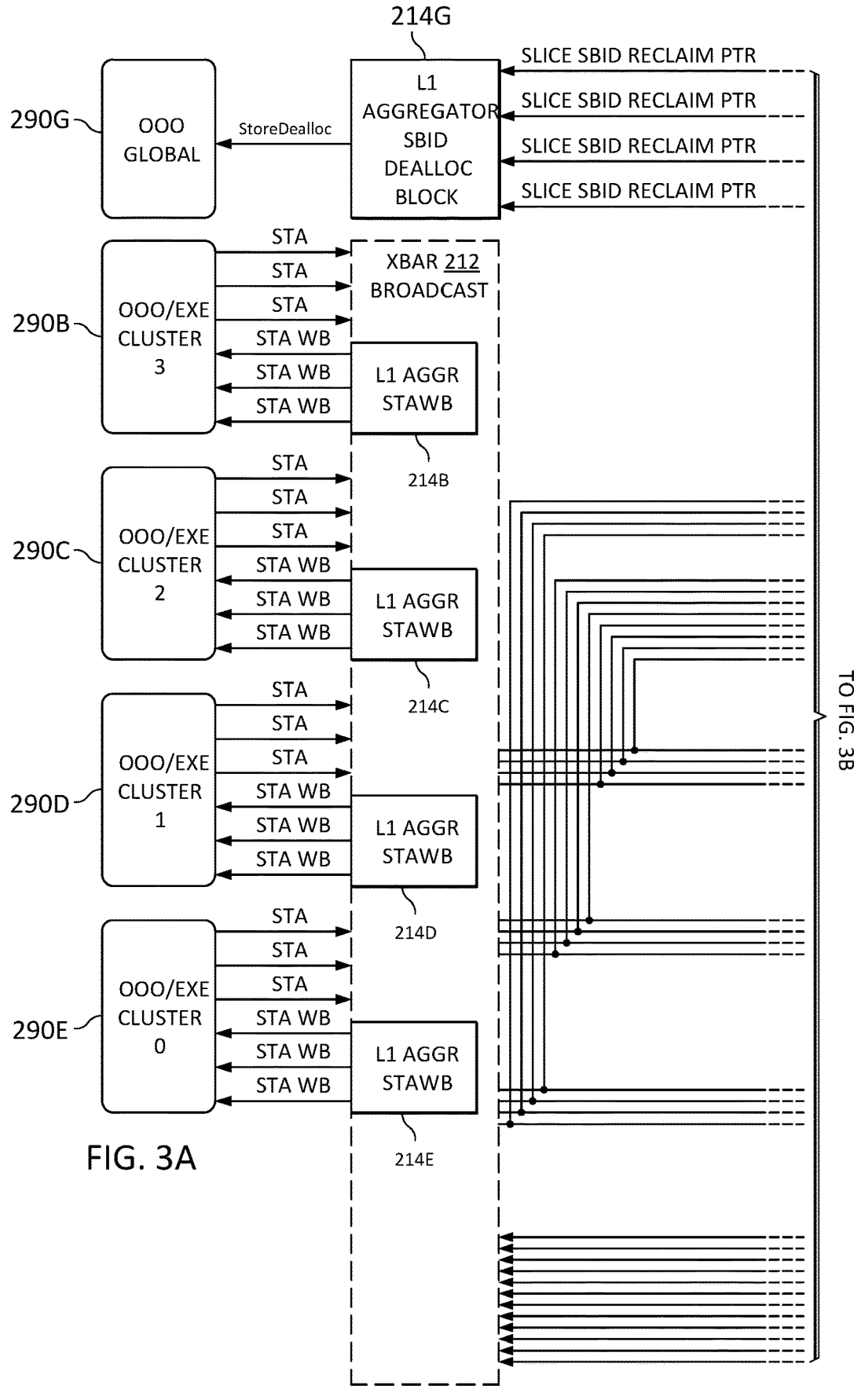
FIGS. 3A and 3B are a block diagram of a memory execution unit according to embodiments.
Figure 3B:
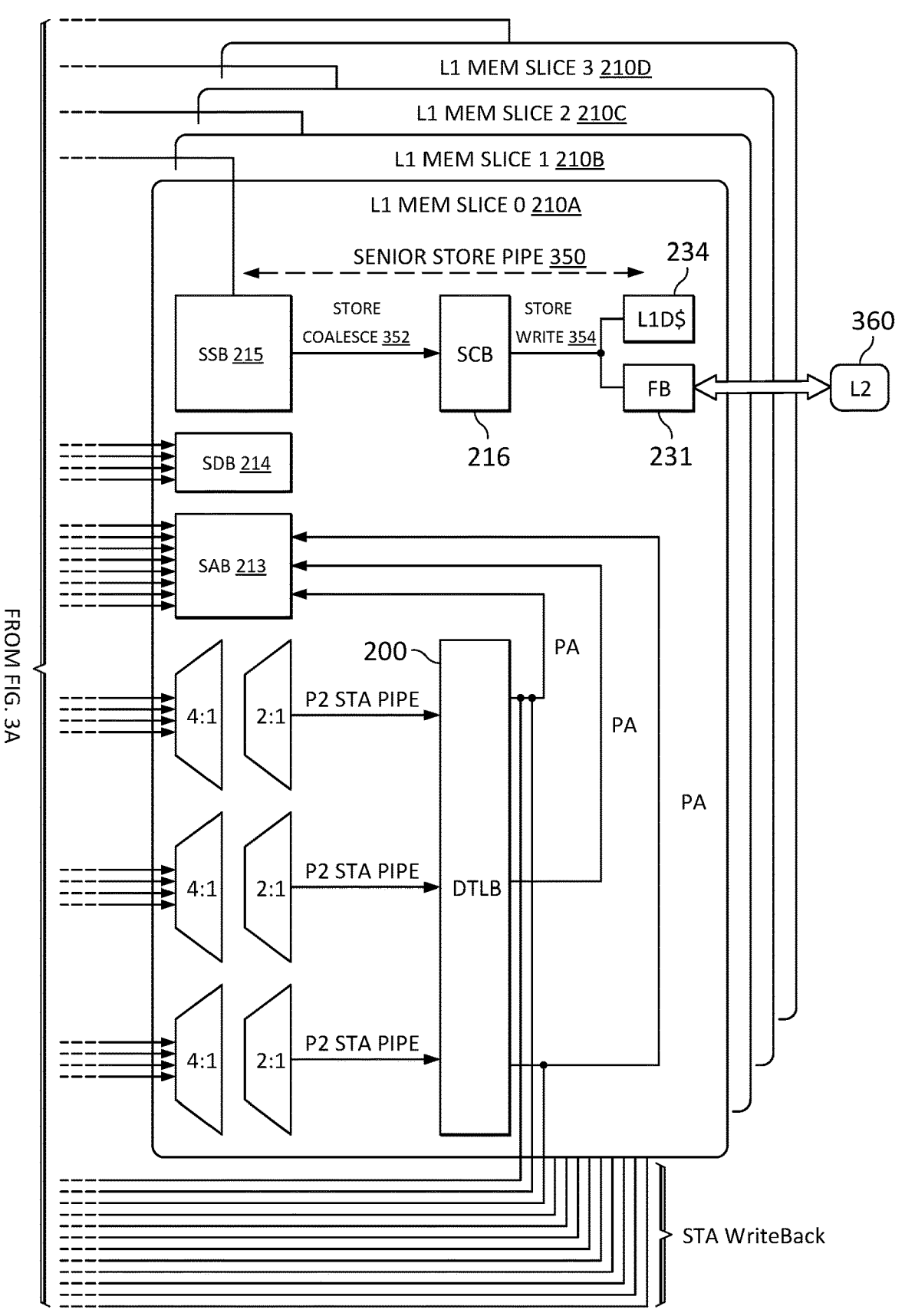

FIGS. 2A, 2B, and 2C illustrate a MEM unit 200 according to an embodiment. As an example, MEM unit 200 in FIG. 2 may correspond to load/store circuits 805 in FIG. 8 as described below. For the example of FIG. 2, the illustration and description are based on L1 sub-unit 210 of MEM unit 200. MEM unit 200 also includes L0 sub-unit 202, L2 sub-unit 204, PMH sub-unit 206, and prefetcher sub-unit 208.

L1 sub-unit 210 (may be referred to as L1 MEM) represents an L1 memory unit with caches and buffers sized (e.g., larger than those in L0 MEM) to support loads and stores in a moderate latency. In embodiments, loads that complete out of L1 MEM may have a six-cycle load-to-use latency, assuming favorable and fast alignments.

The L1 MEM has interfaces with one or more out-of-order (OOO) and/or execution (EXE) units (e.g., OOO/EXE units 290A, 290B, 290C, 290D, 290E, 290F, and 290G) and a front-end (FE) unit (not shown). The OOO and EXE interfaces may be used to synchronize processing around loads and stores, and/or the OOO interface may be used to support performance monitoring. The FE interface may be used to detect potential self-modifying code (SMC) cases and/or to support training memory optimization predictors to attempt to help boost performance.

In order to provide scalable performance, the L1 MEM may be sliced by address. To provide significant scope reduction of memory ordering checks, a given cacheline of memory may only exist in a single slice of L1 MEM. L1 sub-unit 210 includes four slices (210A, 210B, 210C, and 210D) of L1 MEM, where each slice contains a different range of address values compared to the other slices, but other numbers of slices are possible. After a load or store has passed address generation, the appropriate L1 slice for that memory operation may be determined by looking at the linear address bits of the load or store. In the case of line splits, multiple L1 MEM slices may be needed to produce the final load/store result.

L1 MEM crossbar 212 is configured to transmit load uops, store address uops, and store data uops from OOO and EXE clusters into L1 MEM slices. While loads and stores have specific target slices based on their address, the information is effectively broadcast to all slices, and the slices make decisions on what data to catch and process. Crossbar 212 is also configured to transmit results from L1 MEM slices back to OOO and EXE clusters, effectively a broadcast of results back to clusters, and aggregators near the clusters make decisions on what data to collect.

Outside of the sliced memory domain, L1 MEM aggregator 214 includes per-cluster portions 214A, 214B, 214C, 214D, 214E, and 214F and global portion 214G. The per-cluster portions, referred to as clustered aggregators, are to perform per-cluster aggregation and may each include a load writeback (LWB) aggregator to coordinate wakeups and writebacks from slices to the appropriate cluster and store writeback (SWB) aggregator to coordinate writebacks from store address (STA) operations in slices to the appropriate cluster. The global portion, referred to as a global aggregator, includes a store buffer (SB) identifier (ID) aggregator to coordinate deallocation of store buffers from slices back to the global OOO unit.

In embodiments, each slice of L1 MEM includes a load/store unit (LSU 240) and:

Incomplete Load Buffer (ICLB 211)—Holds loads that have been executed by address generation unit (AGU) and are logically part of this slice but have not yet completed.

Global Load Buffer (GLB 212)—Tracking for all loads in the out-of-order window. Only entries for loads that are logically part of this slice will be filled out in detail.

Store Address Buffer (SAB 213)—Tracking for the address component of all stores in the out-of-order window. Only entries for stores that are logically part of this slice will be filled out in detail, while stores outside of this slice will be marked as out of slice for control purposes.

Store Data Buffer (SDB 214)—Data storage for all stores in the out-of-order window. As a store data (STD) uop may not know which slice the address will reside in, the SDB will be populated for all stores whether or not the address eventually resides within this slice. SDB entries are mapped 1:1 against SAB entries.

Senior Store Buffer (SSB 215)—Data storage for the portion of a store that is used in the store coalescing pipeline. This is primarily the physical address and size of a store.

Store Coalescing Buffer (SCB 216)—A cache-line aligned buffer in the logical path between a retired store and the data cache unit/fill buffer (see DCU/FB below) that potentially combines multiple stores into a single entry.

Data-side Translation Lookaside Buffer (DTLB 220)—Contains linear to physical mappings to translate loads and STAs that will execute within this slice. Subdivided into buffers per page size.

Data Cache Unit (DCU 230)—Storage and tracking for the L1 data cache (L1D$234) within this slice, which, for example, contains 64 KB of cache organized as 128 sets, 8 ways, where each cacheline is 64 bytes.

Fill Buffers (FB 231)—Structure to service DCU misses for both loads and senior stores. These misses will be sent as requests to L2 MEM.

Global Ordering Buffer (GOB 232)—Structure to globally order stores in fill buffers across all slices of L1 MEM. There may be a copy of the GOB in every L1 MEM slice.

Eviction Buffers (EVB 233)—Structure to hold evicted modified cachelines from the DCU and manage sending eviction requests to the L2 and respond to writepull requests from the L2. One entry may be reserved for snoops.

Split Registers (SR)—These are not physically located in the slice, but the control logic is within a slice and the registers are logically associated with the low-half slice of a split load.

Self-Modifying code Inspection Reduction Filter (SMIRF)—Filter to prove which STA uops may safely skip sending a self-modifying code (SMC) snoop check to the FE and reduce the number of SMC checks that are sent.

Global Store Scheduler (GSS 242)—Tracks store ordering across slices and guarantees correct store ordering at dispatch on the store write pipeline.

In embodiments, each slice of L1 MEM has its own set of pipelines:

Load Receipt Pipeline—Receives load dispatch and AGU payloads from OOO & EXE and writes the payload into an ICLB entry.

ICLB Scheduling Pipeline—Chooses oldest ready load on a load port from the ICLB and tries to schedule it into the load pipeline.

Load Pipeline—The main load pipeline in L1 MEM to execute a load and write back its results.

Store Address Receipt Pipeline—Receives store address uop payloads and writes them into the store address buffer.

SAB Scheduling Pipeline—Chooses oldest ready STA on a STA port from the SAB and tries to schedule it into the store address pipeline.

Store Data Pipeline—Receives store data payload and writes it into the store data buffer.

Store Address Pipeline—The main store address pipeline in L1 MEM to execute a STA uop and writeback complete to the OOO.

Store Coalescing Pipeline—Takes retired stores from the store buffer and coalesces them into the SCB in preparation for writing to memory.

Store Write Pipeline—Takes SCB entries and writes them into the data cache or a fill buffer.

DCU Fill Pipeline—Takes data from a fill buffer and fills it into the DCU and moves modified data from the DCU into the eviction buffer.

In embodiments, load operations may be performed by or in connection with the operation of the L1 MEM according to, but not limited by, the following description. Loads are assigned a GLB ID at allocation, which will have the side-effect of portbinding the load to a specific AGU port, load port, and writeback port. Loads hold an ICLB credit at allocation, and the exact ICLB entry is allocated after dispatch. After AGU, the load will cross the L1 MEM crossbar and arrive at a specific L1 MEM slice based on the linear address. Once in L1 MEM, the load will arbitrate for a load pipe, which it will eventually win. The load pipe will be responsible for page translation, L1 data cache lookup, and resolving memory ordering against stores. The load will schedule down a load pipe one or more times, until the load eventually binds to data and writes back the data to EXE and complete to the reorder buffer (ROB). Complete loads prepare the GLB to prove memory ordering correctness and will generate a machine clear event if they are found to be in violation. When the load writes back to the OOO, the ICLB entry will be deallocated. When the load is retired, the GLB entry will be deallocated.

In embodiments, store operations may be performed by or in connection with the operation of the L1 MEM according to, but not limited by, the following description. Stores are assigned a SB ID at allocation, which is an exact pointer to an entry in the SAB, SDB, and SSB—the three logical components of the store buffer. The SB ID assignment has a side-effect of portbinding the STA and STD uops to specific AGU and STD ports. Stores have two component uops, an STA uop and an STD uop. The STA and the STD will schedule independently and may arrive in L1 MEM in any order. While an STA is assigned to a specific L1 MEM slice based on linear address, the STD may arrive before an STA is known and therefore will be written into all slices of L1 MEM. When STAs arrive in L1 MEM, the STAs will be written into the SAB. When STDs arrive in MEM, the STDs will be written into the SDB. STAs will arbitrate for and eventually win the STA pipeline. The STA pipeline will be responsible for page translation, resolving memory ordering against loads, and sending the FE a packet to check for SMC violations. The store will hold its SAB, SDB, and SSB entries after retirement. After retirement, stores in a slice will be moved from the SAB, SDB, and SSB into the SCB following age-order within a slice. When a store is moved into the SCB, it will deallocate the SAB, SDB, and SSB entries and eventually return the SB ID to the OOO block for use in younger stores. L1 MEM slices will coordinate SB ID return so that buffer entries are returned in order, despite different slices going out-of-order to move stores into the SCB. Stores may merge into existing SCB entries following specific rules to make them compliant with store ordering rules (e.g., x86 Total Store Ordering (TSO), see details below). The oldest SCB entries in the machine, across all MEM slices, will be scheduled to a store write pipeline to attempt to write the L1 data cache or a fill buffer.

In connection with store operations or otherwise, embodiments may include any of the following details as may be described with reference to FIG. 3. As an example, MEM unit 300 in FIG. 3 may correspond to load/store circuits 805 in FIG. 8 as described below. In FIG. 3, the store coalescing pipeline 352 and store write pipeline 354 are shown together as senior store pipe 350.

Life of Store Example

The STAs may be received and saved in the SAB. Along the path of writing the SAB, a portion of the address (e.g., linear address [7:6]) of the incoming store may be compared with the slice ID of the receiving slice, and the result may be stored in the SAB (e.g., in an entry field referred to as SAB.inslice). This attribute may be used within L1 Mem Slice wherever the store is to be recognized either as in slice or out of slice.

The STDs may be received and saved in the SDB.

The STAs received could arbitrate for a binding STA pipe right away if there are no older STAs from the SAB or SAB skid stage. The winning STA may flow down the pipe for address translation and updating of the SAB and SSB but might be blocked and re-run down the STA pipe multiple times.

Once the OOO unit notifies the MEM unit that a store is (or stores are) retired, MEM slices may move the store retirement pointer to the SSB and move forward to the senior store pipelines.

A store may stay in the SAB/SDB/SSB until it is selected and succeeds in writing into the SCB, then the SB entry could be deallocated.

A store/store-group may stay in the SCB until selected and resulting in a successful write into L1 data cache or FB, then the SCB entry may be deallocated.

Store Coalescing Pipeline Examples

The store coalescing pipeline (or SCB pipeline) may take retired stores and write them into the SCB. The SCB may retain the information about the original program order so that memory may be updated following store ordering rules (e.g., see TSO details below). Once a store has moved from the SB to the SCB, it may become eligible for deallocation.

Implementations may include a single SCB pipeline per L1 MEM slice. In embodiments, up to a maximum number (e.g., three) of retired stores may attempt to schedule into the single SCB pipeline each cycle if they are to the same cacheline and adjacent within the store buffer.

The SCB pipeline may enforce correct store ordering within a slice and might not communicate information across slices to facilitate ordering throughout the core. Instead, that information may be retained in the SCB and used in the subsequent store write pipeline.

Table 1 shows an example of an SCB pipeline as described below.

moved past the last dispositioned not-in-slice store. SSB select may not move past the retired store pointer or select a non-retired store.

SSB Read: Information from the field entries, including the physical address and size of the store, may be read out of the SSB to prepare for coalescing the store.

SSB Allocate: The pipeline may choose the next unallocated SCB entry into which to write the stores. The allocation may be made if an available entry exists and there is no SCB content-addressable-memory (CAM) match.

Broadcast: A decision may be made whether the store group to be written to the SCB is going to closeout coalescing. If closed out, a GSS packet may be broadcast to all slices.

GSS Write: The GSS may track all slices' closed-out SCB entries and stores out of the SCB into the store write pipeline may be scheduled. The slice that meets the age ordering of the stores could potentially schedule its SCB entry.

SDB Read: The SDB entries of the one or more (e.g., 1, 2, or 3) stores that are continuing down the SCB pipeline may be read out and the data may be transmitted to the SCB array in preparation for writing.

SCB Write: The SDB data may be rotated from register alignment into cacheline alignment and written into the SCB data array. The SCB may also set appropriate byte-valid bits.

SSB Update: Stores that have successfully completed the SCB pipeline are eligible for deallocation once all older stores have been deallocated as well. Due to L1 MEM slicing, it may be that younger retired stores in one slice complete their SCB pipeline before older retired stores in a different slice; however, L1 MEM may deallocate SB entries in-order. To manage SB entry reclamation, pointers may be maintained in each slice to indicate the youngest stores that have completed the SCB pipeline. Across all slices, the SB may be deallocated up to the oldest store that has completed the SCB The reclamation pointer may be updated in this slice.

TABLE 1

| stage 1 | stage 2 | stage 3 | stage 4 | stage 5 | stage 6 |
|---------|---------|---------|---------|---------|---------|
| ssb_select | ssb_read | sdb_read | scb_setup_write | ssb_update scb_valid | |
| | scb_allocate broadcast | broadcast | gss_setup_write | gss_valid | |
| | | | | | SBID dealloc @OOO-MEM |

SSB Select: The pipeline may attempt to select up to a maximum number (e.g., three) of retired stores that should be the next oldest senior stores within a slice that have not dispatched into the SCB pipeline. Starting from a select pointer, the select logic may check up to a maximum number (e.g., eight) SSB entries to determine whether they are present in the slice. If none of the checked SSB entries are within the slice, no entries will be selected this cycle. If one or more adjacent checked entries are within the slice, up to a maximum number (e.g., three) of them may be selected to move down the SCB Pipeline. The SCB select pointer may be moved to the SB entry past the last selected store. In the case of not-in-slice entries, the SCB select pointer may be Store Coalescing Buffer Examples The SCB may hold stores, in a merged form, after the stores have been retired and drained from the SAB/SDB and before the SCB entries are written to memory. A store may merge into the SCB entry written by the immediate older store, but they may not merge into SCB entries written by any older stores (except possibly in the case of merging into an entry with multiple immediate older stores). The SCB may merge very effectively when several stores in a row are to the same cacheline and not merge at all when adjacent stores are to random addresses.

Table 2 shows an example format of an SCB entry.

TABLE 2

| Fields | Bits | Description |
|---|---|---|
| PA[51:12] | 40 | physical address tag |
| LA[11:6] | 6 | linear address tag (cacheline) |
| Memtype | 3 | WB stores get coalesced, or UC as well as long as all stores coalesced have the same memtype |
| Bytemask | 64 | byte mask |
| Data | 512 | might not need all 512 bits, but may be aligned with cacheline for direct write |
| Size | 5 | for UC/WP/WT stores |
| LA[5:0] | 6 | for UC/WP/WT stores |
| oldest_sbid | 10 | oldest SB ID |
| oldest_split_info | 2 | is oldest a low half or is oldest a high half |
| youngest_sbid | 10 | youngest SB ID |
| youngest_split_info | 2 | is youngest a low half or is youngest a high half |
| dont_coalesce | 1 | entry is not allowed to coalesce (or coalesce anymore) |
| ready_to_write | 1 | entry is ready to write to the cache |
| Total Bits | 662 | |

Store Coalescing Rules Examples

Write-back (WB), write-combining (WC), non-temporal (NT), and WB-fast-strings may have the opportunity to coalesce on two separate occasions, when they are selected from the SSB by the store coalescing pipeline and when they are being written into the SCB. In both situations, a store may coalesce into an older store if it is its next immediate store in program order, the physical tag matches, and they have the same memory type. Also, the memory consistency model may specify or convention may dictate that, when dealing with store splits, one half be visible to coherence before the other half (e.g., the low-half goes before the high-half, or vice versa). To support splits, an extra rule may be added to the coalescing algorithm.

The following rules may be used to determine when a store is the next immediate of an older store:

STy is next immediate of STx, if the Store Sequence Number (SSN) of STy is the next immediate SSN of STx, i.e., SSN(STy)=SSN(STx)+1

STy is not a split or a low half, i.e., !is_split(STy)|| (split_part(STy)==low_half)

STx is not a split or a high half, i.e., !is_split(STx)|| (split_part(STy)==high_half)

In summary, for two stores STy and STx, STy may coalesce into STx if and only if:

STy and STx have same memory type and that type is WB, WC, NT, or WB-fast-strings Phys_tag(STy)=Phys_tag(STx)

STy is the next immediate of STx

Write-through (WT), write-protect (WP), uncacheable (UC), fences, locks, and input/output (IO) stores may not coalesce, so they allocate a new SCB entry and no subsequent store may coalesce into them.

SCB Entry Close-Out Examples

An SCB entry is eligible for selection (by the store write pipeline) to write to memory if it is no longer a candidate for coalescing and does not have an in-flight store that will coalesce to it (by the SCB pipeline). To avoid this hazard the entry may be first closed out for selection (e.g., 'dont_co-alesce' bit is set) and then added to the GSS.

SCB entries may be closed out by the SCB pipeline at selection time (and before they are broadcast and added to the GSS). An SCB entry may be closed when the senior store in-flight in the SC pipeline does not have its 'SSB_coalen' bit set or its youngest neighbor is not currently retired. If both conditions are false, the entry may remain open until the next senior store coalesces into it (e.g., the 'SSB_coalen' bit is set) and performs the same check on these two conditions (deciding to close the entry then or keep it open for yet another senior store).

The SCB entry close-out algorithm may be based on the 'SSB_coalen' bit. The 'SSB_coalen' bit may be set by a store address compare pipeline, which may (for stores that have completed their STAs) identify the store entries whose immediate youngest neighbor (in program order, not SB position) is eligible for coalescing. A particular store's 'SSB_coalen' bit may be set (e.g., to true) if:

The store has a physical address.

The store can be coalesced into (merging allowed, see memory ordering requirements).

The immediate youngest neighbor (SSN+1) can coalesce, i.e., the neighbor has a physical address and can coalesce into other stores (merging allowed, see memory ordering requirements)

Both stores must have the same ordering, forwarding, and caching properties (see memory ordering requirements)

This comparison may be done between senior, non-senior, or either store, between the time a store has completed its STA and when it is selected by the SCB pipeline. If the test is not done in time, the coalescing opportunity in the SCB (if any) may be lost, but no correctness issues arise.

At any point, a store may be nuked or cleared, which may include stores whose immediate oldest neighbor has its 'SSB_coalen' bit set. This may lead to stores leaving SCB entries open indefinitely since the nuked/cleared store may no longer dispatch in the SCB pipeline and a new store to take its place may not coalesce anymore. This problem may be avoided in two ways:

The SCB pipeline checks if the 'SSB_coalen' bit is set, and if its immediate youngest neighbor has retired when deciding to keep the SCB entry open. Nuked/cleared stores are not retired.

New stores reset the 'SSB_coalen' bit of their immediate oldest neighbor at allocation time.

After a nuke/clear, for the immediate oldest neighbor (of the new store) to have the 'SSB_coalen' bit set to true, the coalescing check has been performed again against this new store (e.g., by the store address compare pipeline).

The new store also resets the complete status of its immediate oldest neighbor in the address comparison buffer so that the coalescing check will be performed again (also at store allocation time).

Total Store Ordering (TSO) Examples

Memory ordering refers to the order that the core issues memory operations (reads/loads and writes/stores) and consistency refers to how multiple cores perceive those operations globally. Embodiments may operate according to a set of rules that govern what ordering is allowed and how that ordering is perceived by multiple cores. For example, a rule set according to the x86 architecture is commonly known as the Total Store Order (TSO) memory model.

In embodiments, an SCB pipeline and/or associated L1 MEM hardware may operate according to and/or support (e.g., including retaining ordering information in the SCB) one or more rule sets (e.g., TSO and/or another) that may specify if and how loads may be reordered (e.g., relative to the original program order between each other and between stores, if and how stores may be reordered between each other, and how loads, stores, and/or their ordering/reordering is to be seen across cores, threads, contexts, etc. For example, implementations may support program and/or processor ordering rules according to which loads are to see all older stores within the same thread or context. For example, implementations may support store ordering rules according to which loads from one thread/context are to see stores from other threads/contexts in-order. For example, implementations may support, with respect to multiple cores/threads updating a single address, that there be a single observable store order and that all cores see that order.

Reordering may relate to when a memory operation may execute (e.g., speculatively, at-retirement, or senior) and how it is to agree with the globally observed order (GO) among all cores (e.g., see strong, processor, weak, and fast below). Together with execution and ordering rules, to fully define a rule set (e.g., TSO) one also defines the memory operation's forwarding, cacheability, combinability, atomicity, and fencing rules. These rules may be different depending on the memory operation and memory type. For example, a list of rules for each memory operation-type pair may be as follows:

In embodiments, ordering rules may be defined between two memory operations (load-load, store-store, and load-store pairs) and may be dependent on if their addresses overlap or not. The ordering rule may have one of three strengths:

Exact: globally visible or observe data in program order

Perceived: load may bind to data if not perceivable by the program

None: may be globally visible or observe data in any order

X86 supports four different ordering models, each with different strengths:

Strong: strongest ordering requirements; requires exact ordering strength

Processor: the typical order of loads; relies on perceived ordering strength

Weak: no ordering requirements; no ordering strength

Fast: weak ordering within memory uops from the same macro-op; processor ordering between any other uop Global Order Buffer Examples When the store write pipeline is not able to write the store group to the DCU (e.g., cache miss or uncacheable), it writes the store group into the FB instead. So that stores are written to memory in program order, the store write pipeline also enqueues the FB entry info in the global order buffer (GOB). The GOB may be an age ordered queue, shared among all L1 slices, with (for example) 64 entries (equal the total number of FB entries across all slices). Each entry tracks the FB entry info (e.g., fb_id+slice_id pair) and L2 global order (L2-GO) status.

The GOB tracks slices' data writes that are waiting to be written to memory from the FB in program order (e.g., in the order they leave the SCB). Once the corresponding memory location is allowed to be written by the coherence protocol, the L2 (360) sends the GO packet to the GOB and the entry is marked as having received its L2-GO. When a GOB entry receives its L2-GO, the GOB identifies the oldest contiguous group of entries that have received their L2-GO. Those entries will then be marked as being globally ordered (big-GO) and are finally ready to be written to memory. The GOB then notifies the respective slices' FBs about the GOed entries (so the FB can mark those entries as big-GO) and pops them from the GOB. All younger loads/stores may now bind-to/overwrite data in these entries on the FB.

'Processor' and 'Strong' ordered stores are enqueued in the GOB to track the original program order. 'Weak' ordered stores do not have ordering requirements, so age order tracking in the GOB is not necessary. However, the GOB is still notified of how many 'Weak' ordered stores are in all slices' FBs to track the total pending 'Weak' stores (tracked in a counter in the GOB, the WC counter). Therefore, the L1's load and store-write pipelines may verify global ordering status for certain fences and order models. A similar approach may be used for 'Fast' ordered stores.

Method Examples

FIG. 4 illustrates a method 400 for scheduling merged store operations according to embodiments. Method 400 may be performed by and/or in connection with the operation of a MEM unit such as MEM unit 200 or MEM unit 300 as described above.

Box 410 represents storing, in a store buffer of a processor core, first information associated with a first retired store operation. Box 420 represents receiving, by a store coalescing buffer (SCB) of the processor core, the first information from the store buffer. Box 430 represents storing, in an SCB entry, the first information. Box 440 represents storing, in the store buffer, second information associated with a second retired store operation.

Box 450 represents determining that the SCB entry is eligible for merging. The determining is based on whether the second retired store operation is a next immediate store in program order of the first retired store operation, whether a physical address tag associated with the second retired store operation matches a physical address tag associated with the first retired store operation, and/or whether a memory type indicator associated with the second retired store operation matches a memory type indicator associated with the first retired store operation. Box 452 represents writing to an indicator in the SCB entry to indicate that the entry is eligible for merging. Box 454 represents merging the second information from the store buffer into the entry of the SCB.

Box 460 represents providing, by the SCB, data associated with the entry for a write to a data cache or a fill buffer. Box 470 represents scheduling the write relative to an other write from an other SCB in compliance with one or more store ordering rules. In embodiments, the SCB is associated with an address-based slice of the data cache and the other SCB is associated with an other address-based slice of the data cache. In embodiments, scheduling the write is based at least in part on the merge indicator field.

Box 480 represents determining whether the write is to the data cache or to the fill buffer. Box 490 represents ordering a memory write, in compliance with the one or more store ordering rules, from the fill buffer, relative to an other write from an other fill buffer, wherein the fill buffer is associated with an address-based slice of the data cache and the other fill buffer is associated with an other address-based slice of the data cache.

Additional Example Embodiments

In embodiments, an apparatus includes a data cache; a fill buffer; a store buffer to store first information associated with a first retired store operation and second information associated with a second retired store operation; a store coalescing buffer (SCB) to receive the first information from the store buffer, to store the first information in an SCB entry, to merge the second information from the store buffer into the entry, and to provide data associated with the entry for a write to the data cache or the fill buffer; and a global store scheduler (GS S) to schedule the write relative to an other write from an other SCB in compliance with one or more store ordering rules.

Any such embodiments may include any or any combination of the following aspects. The SCB may be associated with a slice of the data cache and the other SCB may be associated with an other slice of the data cache. The slice may be associated with an address range different from an address range to be associated with the other slice. The SCB entry may include an indicator to indicate whether the entry is eligible for merging. The write may be to the data cache in response to a cache hit and to the fill buffer in response to a cache miss. The apparatus may also include a global ordering buffer to order a memory write, in compliance with the one or more store ordering rules, from the fill buffer relative to an other memory write from an other fill buffer. The fill buffer may be associated with a slice of the data cache and the other fill buffer is to be associated with an other slice of the data cache. The slice may be associated with an address range different from an address range to be associated with the other slice. The global ordering buffer may include a copy to be associated with the slice and an other copy to be associated with the other slice.

In embodiments, a method includes storing, in a store buffer of a processor core, first information associated with a first retired store operation; receiving, by a store coalescing buffer (SCB) of the processor core, the first information from the store buffer; storing, in an SCB entry, the first information; storing, in the store buffer, second information associated with a second retired store operation; merging the second information from the store buffer into the entry of the SCB; providing, by the SCB, data associated with the entry for a write to a data cache or a fill buffer; and scheduling the write relative to an other write from an other SCB in compliance with one or more store ordering rules.

Any such embodiments may include any or any combination of the following aspects. The SCB may be associated with an address-based slice of the data cache and the other SCB is associated with an other address-based slice of the data cache. The method may also include determining whether the SCB entry is eligible for merging; and writing to an indicator in the SCB entry to indicate whether the entry is eligible for merging. Determining may be based at least in part on whether the second retired store operation is a next immediate store in program order of the first retired store operation. Determining may be based at least in part on whether a physical address tag associated with the second retired store operation matches a physical address tag associated with the first retired store operation. Determining may be based at least in part on whether a memory type indicator associated with the second retired store operation matches a memory type indicator associated with the first retired store operation. Scheduling the write may be based at least in part on the merge indicator field. The method may also include determining whether the write is to the data cache or to the fill buffer. The method may also include ordering a memory write, in compliance with the one or more store ordering rules, from the fill buffer, relative to an other memory write from an other fill buffer, wherein the fill buffer is associated with an address-based slice of the data cache and the other fill buffer is associated with an other address-based slice of the data cache.

In embodiments, a system includes a processor core including a data cache; a fill buffer; a store buffer to store first information associated with a first retired store operation and second information associated with a second retired store operation; a store coalescing buffer (SCB) to receive the first information from the store buffer, to store the first information in an SCB entry, to merge the second information from the store buffer into the entry, and to provide data associated with the entry for a write to the data cache or the fill buffer; and a global store scheduler (GSS) to schedule the write relative to an other write from an other SCB in compliance with one or more store ordering rules. The system also includes a memory controller to couple the processor core to one or more memories of a system memory.

Any such embodiments may include any or any combination of the following aspects. The system memory may include one or more dynamic random-access memories. The SCB may be associated with a slice of the data cache and the other SCB may be associated with an other slice of the data cache. The slice may be associated with an address range different from an address range to be associated with the other slice. The SCB entry may include an indicator to indicate whether the entry is eligible for merging. The write may be to the data cache in response to a cache hit and to the fill buffer in response to a cache miss. The processor core may also include a global ordering buffer to order a memory write, in compliance with the one or more store ordering rules, from the fill buffer relative to an other memory write from an other fill buffer. The fill buffer may be associated with a slice of the data cache and the other fill buffer is to be associated with an other slice of the data cache. The slice may be associated with an address range different from an address range to be associated with the other slice. The global ordering buffer may include a copy to be associated with the slice and an other copy to be associated with the other slice.

In embodiments, an apparatus may include means for performing any function disclosed herein. In embodiments, an apparatus may include a data storage device that stores code that when executed by a hardware processor or controller causes the hardware processor or controller to perform any method or portion of a method disclosed herein. In embodiments, an apparatus may be as described in the detailed description. In embodiments, a method may be as described in the detailed description. In embodiments, a non-transitory machine-readable medium may store instructions that when executed by a machine causes the machine to perform any method or portion of a method disclosed herein. Embodiments may include any details, features, etc. or combinations of details, features, etc. described in this specification.

Exemplary Computer Architectures

Detailed below are describes of example computer architectures. Other system designs and configurations known in the arts for laptop, desktop, and handheld personal computers (PC)s, personal digital assistants, engineering worksta-tions, servers, disaggregated servers, network devices, net-work hubs, switches, routers, embedded processors, digital signal processors (DSPs), graphics devices, video game devices, set-top boxes, micro controllers, cell phones, por-table media players, hand-held devices, and various other electronic devices, are also suitable. In general, a variety of systems or electronic devices capable of incorporating a processor and/or other execution logic as disclosed herein are generally suitable.

Figure 5:
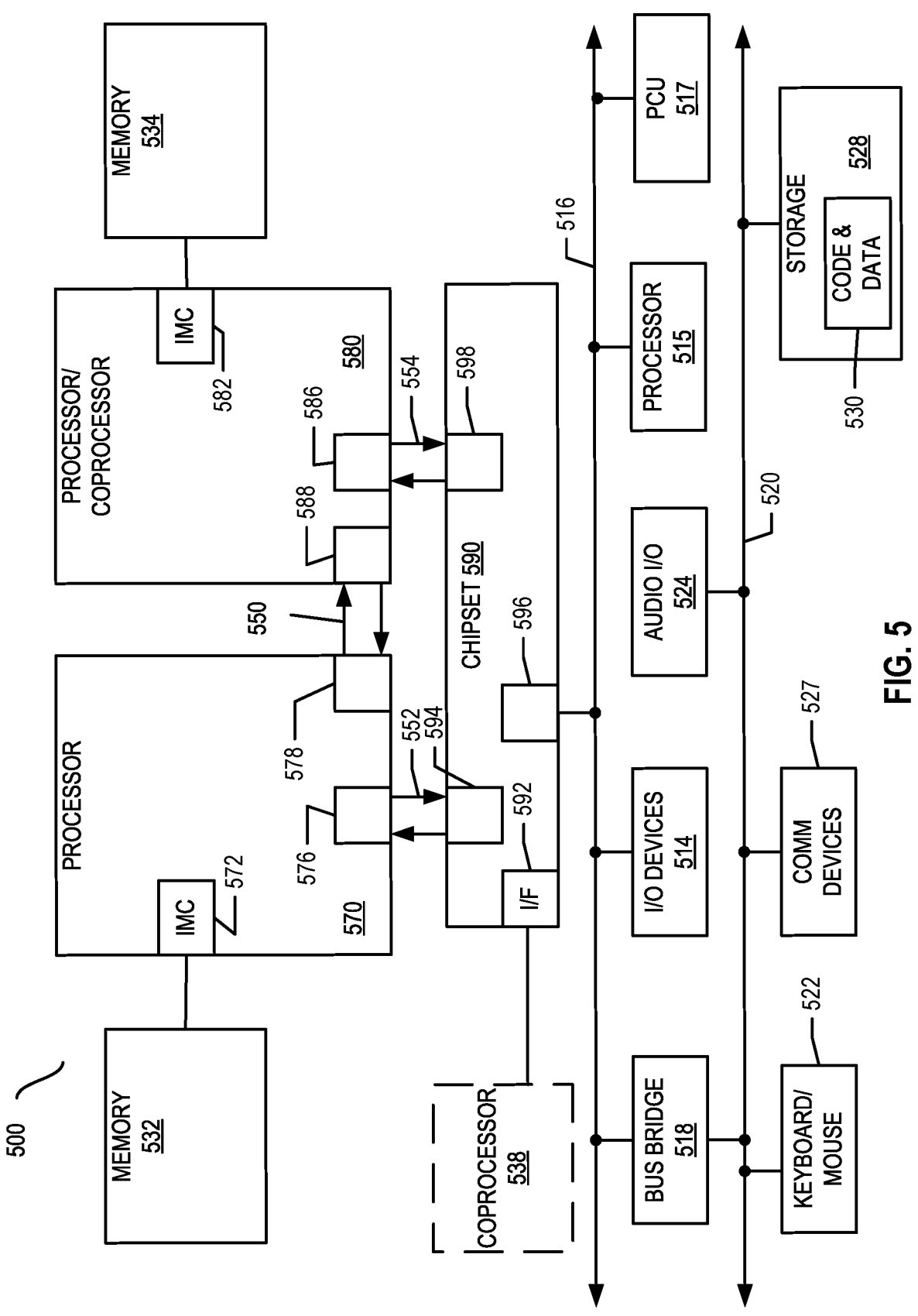
FIG. 5 illustrates an example computing system.

FIG. 5 illustrates an example of a computing system. Multiprocessor system 500 is an interfaced system and includes a plurality of processors or cores including a first processor 570 and a second processor 580 coupled via an interface 550 such as a point-to-point interconnect, a fabric, and/or bus. In some examples, the first processor 570 and the second processor 580 are homogeneous. In some examples, first processor 570 and the second processor 580 are het-erogenous. Though the example system 500 is shown to have two processors, the system may have three or more processors, or may be a single processor system. In some examples, the computing system is a system on a chip (SoC).

Processors 570 and 580 are shown including integrated memory controller (IMC) circuitry 572 and 582, respec-tively. Processor 570 also includes as part of its interfaces 576 and 578; similarly, second processor 580 includes interfaces 586 and 588. Processors 570, 580 may exchange information via the interface 550 using interface circuits 578, 588. IMCs 572 and 582 couple the processors 570, 580 to respective memories, namely a memory 532 and a memory 534, which may be portions of main memory locally attached to the respective processors.

Processors 570, 580 may each exchange information with a network interface 590 via individual interfaces 552, 554 using interface circuits 576, 594, 586, 598. The network interface 590 (e.g., one or more of an interconnect, bus, and/or fabric, and in some examples is a chipset) may optionally exchange information with a coprocessor 538 via an interface 592. In some examples, the coprocessor 538 is a special-purpose processor, such as, for example, a high-throughput processor, a network or communication proces-sor, compression engine, graphics processor, general pur-pose graphics processing unit (GPGPU), neural-network processing unit (NPU), embedded processor, or the like.

A shared cache (not shown) may be included in either processor 570, 580 or outside of both processors, yet con-nected with the processors via P-P interconnect, such that either or both processors' local cache information may be stored in the shared cache if a processor is placed into a low power mode.

Network interface 590 may be coupled to a first interface 516 via an interface 596. In some examples, first interface 516 may be a Peripheral Component Interconnect (PCI) interconnect, or an interconnect such as a PCI Express interconnect or another I/O interconnect. In some examples, one of the interfaces couples to a power control unit (PCU) 517, which may include circuitry, software, and/or firmware to perform power management operations with regard to the processors 570, 580 and/or co-processor 538. PCU 517 provides control information to a voltage regulator (not shown) to cause the voltage regulator to generate the appro-priate regulated voltage. PCU 517 also provides control information to control the operating voltage generated. In various examples, PCU 517 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to exter-nal sources (such as a platform or power management source or system software).

PCU 517 is illustrated as being present as logic separate from the processor 570 and/or processor 580. In other cases, PCU 517 may execute on a given one or more of cores (not shown) of processor 570 or 580. In some cases, PCU 517 may be implemented as a microcontroller (dedicated or general-purpose) or other control logic configured to execute its own dedicated power management code, sometimes referred to as P-code. In yet other examples, power man-agement operations to be performed by PCU 517 may be implemented externally to a processor, such as by way of a separate power management integrated circuit (PMIC) or another component external to the processor. In yet other examples, power management operations to be performed by PCU 517 may be implemented within BIOS or other system software.

Various I/O devices 514 may be coupled to first interface 516, along with a bus bridge 518 which couples first interface 516 to a second interface 520. In some examples, one or more additional processor(s) 515, such as coproces-sors, high throughput many integrated core (MIC) proces-sors, GPGPUs, accelerators (such as graphics accelerators or digital signal processing (DSP) units), field programmable gate arrays (FPGAs), or any other processor, are coupled to first interface 516. In some examples, second interface 520 may be a low pin count (LPC) interface. Various devices may be coupled to second interface 520 including, for example, a keyboard and/or mouse 522, communication devices 527 and a storage circuitry 528. Storage circuitry 528 may be one or more non-transitory machine-readable storage media as described below, such as a disk drive or other mass storage device which may include instructions/ code and data 530 and may implement the storage 'ISAB03 in some examples. Further, an audio I/O 524 may be coupled to second interface 520. Note that other architectures than the point-to-point architecture described above are possible. For example, instead of the point-to-point architecture, a system such as multiprocessor system 500 may implement a multi-drop interface or other such architecture.

Example Core Architectures, Processors, and Computer Architectures

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of dif-ferent processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip (SoC) that may be included on the same die as the described CPU (sometimes referred to as the application core(s) or application processor(s)), the above described coprocessor, and additional functionality. Example core architectures are described next, followed by descriptions of example processors and computer architectures.

Figure 6:
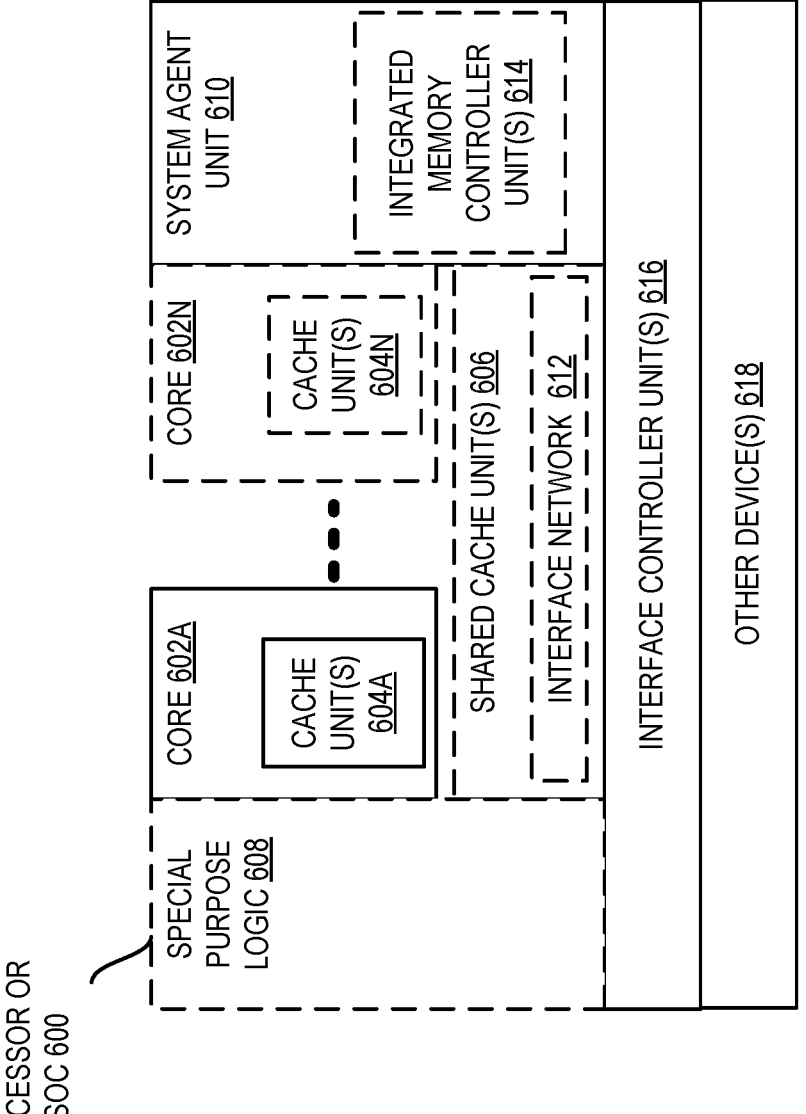
FIG. 6 illustrates a block diagram of an example processor that may have one or more cores and an integrated memory controller.

FIG. 6 illustrates a block diagram of examples of a processor 600 and/or SoC that may have one or more cores and an integrated memory controller. The solid lined boxes illustrate a processor 600 with a single core 602A, a system agent unit circuitry 610, and a set of one or more interface controller unit(s) circuitry 616, while the optional addition of the dashed lined boxes illustrates an alternative processor 600 with multiple cores 602(A)-(N), a set of one or more integrated memory controller unit(s) circuitry 614 in the system agent unit circuitry 610, and special purpose logic 608, as well as a set of one or more interface controller units circuitry 616. Note that the processor 600 may be one of the processors 570 or 580, or co-processor 538 or 515 of FIG. 5.

Thus, different implementations of the processor 600 may include: 1) a CPU with the special purpose logic 608 being integrated graphics and/or scientific (throughput) logic (which may include one or more cores, not shown), and the cores 602(A)-(N) being one or more general purpose cores (e.g., general purpose in-order cores, general purpose out-of-order cores, or a combination of the two); 2) a coprocessor with the cores 602(A)-(N) being a large number of special purpose cores intended primarily for graphics and/or scientific (throughput); and 3) a coprocessor with the cores 602(A)-(N) being a large number of general purpose in-order cores. Thus, the processor 600 may be a general-purpose processor, coprocessor, or special-purpose processor, such as, for example, a network or communication processor, compression engine, graphics processor, GPGPU (general purpose graphics processing unit circuitry), a high throughput many integrated cores (MIC) coprocessor (including 30 or more cores), embedded processor, or the like. The processor may be implemented on one or more chips. The processor 600 may be a part of and/or may be implemented on one or more substrates using any of a number of process technologies, such as, for example, complementary metal oxide semiconductor (CMOS), bipolar CMOS (BiCMOS), P-type metal oxide semiconductor (PMOS), or N-type metal oxide semiconductor (NMOS).

A memory hierarchy includes one or more levels of cache unit(s) circuitry 604(A)-(N) within the cores 602(A)-(N), a set of one or more shared cache unit(s) circuitry 606, and external memory (not shown) coupled to the set of integrated memory controller unit(s) circuitry 614. The set of one or more shared cache unit(s) circuitry 606 may include one or more mid-level caches, such as level 2 (L2), level 3 (L3), level 4 (L4), or other levels of cache, such as a last level cache (LLC), and/or combinations thereof. While in some examples an interface network circuitry 612 (e.g., a ring interconnect) interfaces the special purpose logic 608 (e.g., integrated graphics logic), the set of shared cache unit(s) circuitry 606, and the system agent unit circuitry 610, alternative examples use any number of well-known techniques for interfacing such units. In some examples, coherency is maintained between one or more of the shared cache unit(s) circuitry 606 and cores 602(A)-(N). In some examples, controller units circuitry 616 couple the cores 602 to one or more other devices 618 such as one or more I/O devices, storage, one or more communication devices (e.g., wireless networking, wired networking, etc.), etc.

In some examples, one or more of the cores 602(A)-(N) are capable of multi-threading. The system agent unit circuitry 610 includes those components coordinating and operating cores 602(A)-(N). The system agent unit circuitry 610 may include, for example, power control unit (PCU) circuitry and/or display unit circuitry (not shown). The PCU may be or may include logic and components needed for regulating the power state of the cores 602(A)-(N) and/or the special purpose logic 608 (e.g., integrated graphics logic). The display unit circuitry is for driving one or more externally connected displays.

The cores 602(A)-(N) may be homogenous in terms of instruction set architecture (ISA). Alternatively, the cores 602(A)-(N) may be heterogeneous in terms of ISA; that is, a subset of the cores 602(A)-(N) may be capable of executing an ISA, while other cores may be capable of executing only a subset of that ISA or another ISA.

Example Core Architectures-In-order and out-of-order core block diagram

Figure 7A:
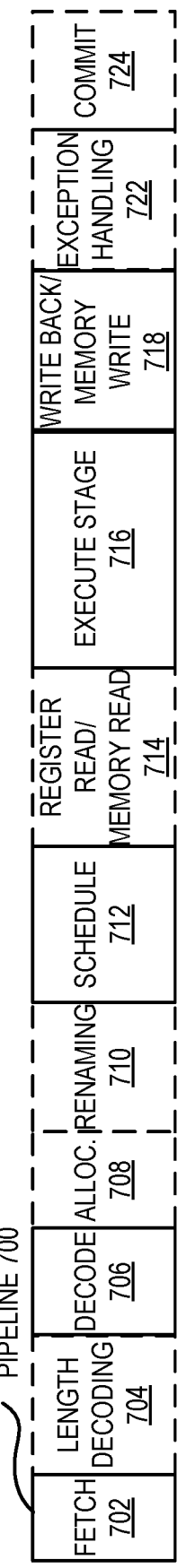
FIG. 7(A) is a block diagram illustrating both an example in-order pipeline and an example register renaming, out-of-order issue/execution pipeline according to examples.
Figure 7B:
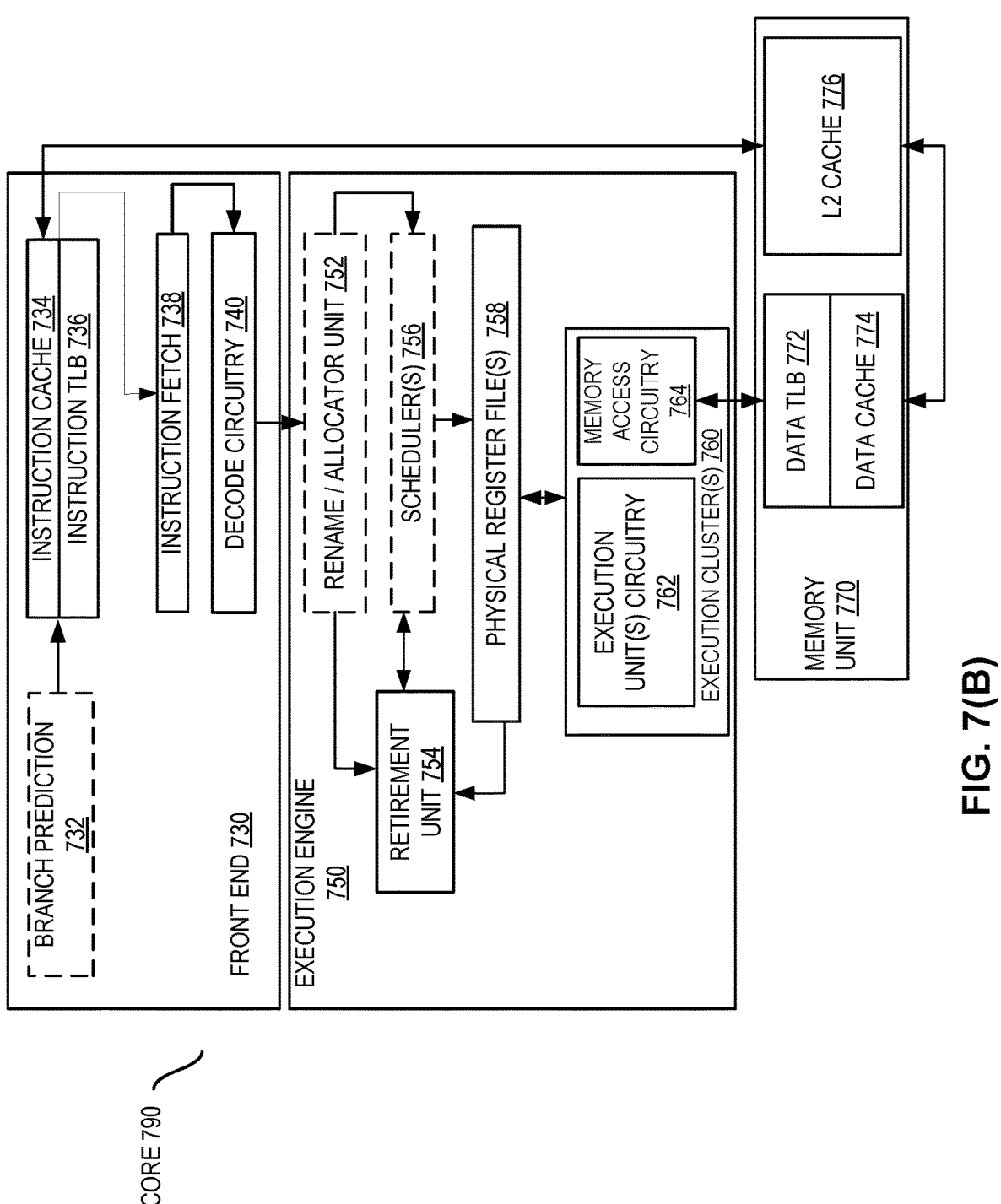
FIG. 7(B) is a block diagram illustrating both an example of an in-order architecture core and an example register renaming, out-of-order issue/execution architecture core to be included in a processor according to examples.

FIG. 7(A) is a block diagram illustrating both an example in-order pipeline and an example register renaming, out-of-order issue/execution pipeline according to examples. FIG. 7(B) is a block diagram illustrating both an example of an in-order architecture core and an example register renaming, out-of-order issue/execution architecture core to be included in a processor according to examples. The solid lined boxes in FIGS. 7(A)-(B) illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 7(A), a processor pipeline 700 includes a fetch stage 702, an optional length decoding stage 704, a decode stage 706, an optional allocation (Alloc) stage 708, an optional renaming stage 710, a schedule (also known as a dispatch or issue) stage 712, an optional register read/memory read stage 714, an execute stage 716, a write back/memory write stage 718, an optional exception handling stage 722, and an optional commit stage 724. One or more operations can be performed in each of these processor pipeline stages. For example, during the fetch stage 702, one or more instructions are fetched from instruction memory, and during the decode stage 706, the one or more fetched instructions may be decoded, addresses (e.g., load store unit (LSU) addresses) using forwarded register ports may be generated, and branch forwarding (e.g., immediate offset or a link register (LR)) may be performed. In one example, the decode stage 706 and the register read/memory read stage 714 may be combined into one pipeline stage. In one example, during the execute stage 716, the decoded instructions may be executed, LSU address/data pipelining to an Advanced Microcontroller Bus (AMB) interface may be performed, multiply and add operations may be performed, arithmetic operations with branch results may be performed, etc.

By way of example, the example register renaming, out-of-order issue/execution architecture core of FIG. 7(B) may implement the pipeline 700 as follows: 1) the instruction fetch circuitry 738 performs the fetch and length decoding stages 702 and 704; 2) the decode circuitry 740 performs the decode stage 706; 3) the rename/allocator unit circuitry 752 performs the allocation stage 708 and renaming stage 710; 4) the scheduler(s) circuitry 756 performs the schedule stage 712; 5) the physical register file(s) circuitry 758 and the memory unit circuitry 770 perform the register read/memory read stage 714; the execution cluster(s) 760 perform the execute stage 716; 6) the memory unit circuitry 770 and the physical register file(s) circuitry 758 perform the write back/memory write stage 718; 7) various circuitry may be involved in the exception handling stage 722; and 8) the retirement unit circuitry 754 and the physical register file(s) circuitry 758 perform the commit stage 724.

FIG. 7(B) shows a processor core 790 including front-end unit circuitry 730 coupled to an execution engine unit circuitry 750, and both are coupled to a memory unit circuitry 770. The core 790 may be a reduced instruction set architecture computing (RISC) core, a complex instruction set architecture computing (CISC) core, a very long instruction word (VLIW) core, or a hybrid or alternative core type. As yet another option, the core 790 may be a special-purpose core, such as, for example, a network or communication core, compression engine, coprocessor core, general purpose computing graphics processing unit (GPGPU) core, graphics core, or the like.

The front-end unit circuitry 730 may include branch prediction circuitry 732 coupled to an instruction cache circuitry 734, which is coupled to an instruction translation lookaside buffer (TLB) 736, which is coupled to instruction fetch circuitry 738, which is coupled to decode circuitry 740. In one example, the instruction cache circuitry 734 is included in the memory unit circuitry 770 rather than the front-end circuitry 730. The decode circuitry 740 (or decoder) may decode instructions, and generate as an output one or more micro-operations, micro-code entry points, microinstructions, other instructions, or other control signals, which are decoded from, or which otherwise reflect, or are derived from, the original instructions. The decode circuitry 740 may further include an address generation unit (AGU, not shown) circuitry. In one example, the AGU generates an LSU address using forwarded register ports, and may further perform branch forwarding (e.g., immediate offset branch forwarding, LR register branch forwarding, etc.). The decode circuitry 740 may be implemented using various different mechanisms. Examples of suitable mechanisms include, but are not limited to, look-up tables, hardware implementations, programmable logic arrays (PLAs), microcode read only memories (ROMs), etc. In one example, the core 790 includes a microcode ROM (not shown) or other medium that stores microcode for certain macroinstructions (e.g., in decode circuitry 740 or otherwise within the front-end circuitry 730). In one example, the decode circuitry 740 includes a micro-operation (micro-op) or operation cache (not shown) to hold/cache decoded operations, micro-tags, or micro-operations generated during the decode or other stages of the processor pipeline 700. The decode circuitry 740 may be coupled to rename/allocator unit circuitry 752 in the execution engine circuitry 750.

The execution engine circuitry 750 includes the rename/allocator unit circuitry 752 coupled to a retirement unit circuitry 754 and a set of one or more scheduler(s) circuitry 756. The scheduler(s) circuitry 756 represents any number of different schedulers, including reservations stations, central instruction window, etc. In some examples, the scheduler(s) circuitry 756 can include arithmetic logic unit (ALU) scheduler/scheduling circuitry, ALU queues, address generation unit (AGU) scheduler/scheduling circuitry, AGU queues, etc. The scheduler(s) circuitry 756 is coupled to the physical register file(s) circuitry 758. Each of the physical register file(s) circuitry 758 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one example, the physical register file(s) circuitry 758 includes vector registers unit circuitry, writemask registers unit circuitry, and scalar register unit circuitry. These register units may provide architectural vector registers, vector mask registers, general-purpose registers, etc. The physical register file(s) circuitry 758 is coupled to the retirement unit circuitry 754 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 754 and the physical register file(s) circuitry 758 are coupled to the execution cluster(s) 760. The execution cluster(s) 760 includes a set of one or more execution unit(s) circuitry 762 and a set of one or more memory access circuitry 764. The execution unit(s) circuitry 762 may perform various arithmetic, logic, floating-point or other types of operations (e.g., shifts, addition, subtraction, multiplication) and on various types of data (e.g., scalar integer, scalar floating-point, packed integer, packed floating-point, vector integer, vector floating-point). While some examples may include a number of execution units or execution unit circuitry dedicated to specific functions or sets of functions, other examples may include only one execution unit circuitry or multiple execution units/execution unit circuitry that all perform all functions. The scheduler(s) circuitry 756, physical register file(s) circuitry 758, and execution cluster(s) 760 are shown as being possibly plural because certain examples create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) circuitry, and/or execution cluster—and in the case of a separate memory access pipeline, certain examples are implemented in which only the execution cluster of this pipeline has the memory access unit(s) circuitry 764). It should also be understood that where separate pipelines are used, one or more of these pipelines may be out-of-order issue/execution and the rest in-order.

In some examples, the execution engine unit circuitry 750 may perform load store unit (LSU) address/data pipelining to an Advanced Microcontroller Bus (AMB) interface (not shown), and address phase and writeback, data phase load, store, and branches.

The set of memory access circuitry 764 is coupled to the memory unit circuitry 770, which includes data TLB circuitry 772 coupled to a data cache circuitry 774 coupled to a level 2 (L2) cache circuitry 776. In one example, the memory access circuitry 764 may include a load unit circuitry, a store address unit circuit, and a store data unit circuitry, each of which is coupled to the data TLB circuitry 772 in the memory unit circuitry 770. The instruction cache circuitry 734 is further coupled to the level 2 (L2) cache circuitry 776 in the memory unit circuitry 770. In one example, the instruction cache 734 and the data cache 774 are combined into a single instruction and data cache (not shown) in L2 cache circuitry 776, a level 3 (L3) cache circuitry (not shown), and/or main memory. The L2 cache circuitry 776 is coupled to one or more other levels of cache and eventually to a main memory.

The core 790 may support one or more instructions sets (e.g., the x86 instruction set architecture (optionally with some extensions that have been added with newer versions);

the MIPS instruction set architecture; the ARM instruction set architecture (optionally with optional additional extensions such as NEON)), including the instruction(s) described herein. In one example, the core 790 includes logic to support a packed data instruction set architecture extension (e.g., AVX1, AVX2), thereby allowing the operations used by many multimedia applications to be performed using packed data.

Example Execution Unit(s) Circuitry

Figure 8:
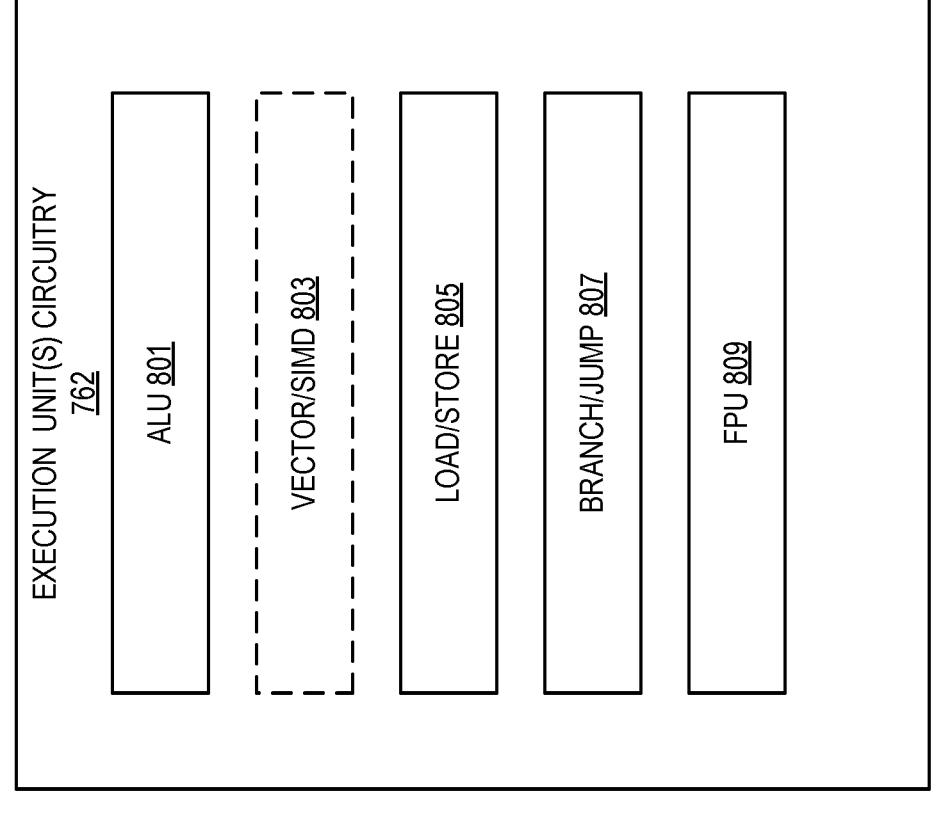
FIG. 8 illustrates examples of execution unit(s) circuitry.

FIG. 8 illustrates examples of execution unit(s) circuitry, such as execution unit(s) circuitry 762 of FIG. 7(B). As illustrated, execution unit(s) circuitry 762 may include one or more ALU circuits 801, optional vector/single instruction multiple data (SIMD) circuits 803, load/store circuits 805, branch/jump circuits 807, and/or Floating-point unit (FPU) circuits 809. ALU circuits 801 perform integer arithmetic and/or Boolean operations. Vector/SIMD circuits 803 perform vector/SIMD operations on packed data (such as SIMD/vector registers). Load/store circuits 805 execute load and store instructions to load data from memory into registers or store from registers to memory. Load/store circuits 805 may also generate addresses. Branch/jump circuits 807 cause a branch or jump to a memory address depending on the instruction. FPU circuits 809 perform floating-point arithmetic. The width of the execution unit(s) circuitry 762 varies depending upon the example and can range from 16-bit to 1,024-bit, for example. In some examples, two or more smaller execution units are logically combined to form a larger execution unit (e.g., two 128-bit execution units are logically combined to form a 256-bit execution unit).

Program code may be applied to input information to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), a field programmable gate array (FPGA), a microprocessor, or any combination thereof.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

Examples of the mechanisms disclosed herein may be implemented in hardware, software, firmware, or a combination of such implementation approaches. Examples may be implemented as computer programs or program code executing on programmable systems comprising at least one processor, a storage system (including volatile and non-volatile memory and/or storage elements), at least one input device, and at least one output device.

One or more aspects of at least one example may be implemented by representative instructions stored on a machine-readable medium which represents various logic within the processor, which when read by a machine causes the machine to fabricate logic to perform the techniques described herein. Such representations, known as "intellectual property (IP) cores" may be stored on a tangible, machine readable medium and supplied to various customers or manufacturing facilities to load into the fabrication machines that make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, examples also include non-transitory, tangible machine-readable media containing instructions or containing design data, such as Hardware Description Language (HDL), which defines structures, circuits, apparatuses, processors and/or system features described herein. Such examples may also be referred to as program products.

Emulation (Including Binary Translation, Code Morphing, Etc.)

In some cases, an instruction converter may be used to convert an instruction from a source instruction set architecture to a target instruction set architecture. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 9:
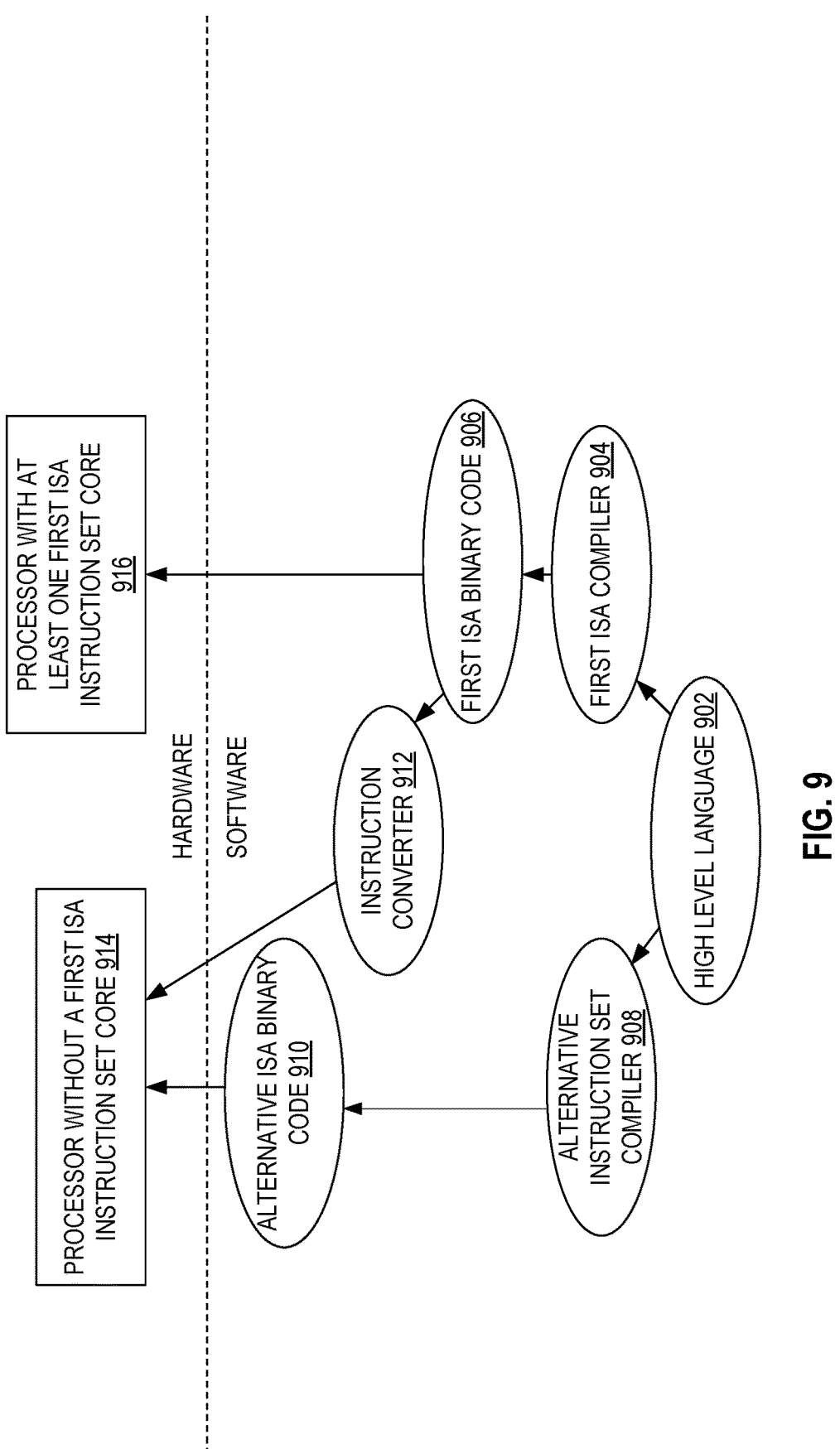
FIG. 9 is a block diagram illustrating the use of a software instruction converter to convert binary instructions in a source instruction set architecture to binary instructions in a target instruction set architecture according to examples.

FIG. 9 illustrates a block diagram contrasting the use of a software instruction converter to convert binary instructions in a source instruction set architecture to binary instructions in a target instruction set architecture according to examples. In the illustrated example, the instruction converter is a software instruction converter, although alternatively the instruction converter may be implemented in software, firmware, hardware, or various combinations thereof. FIG. 9 shows a program in a high-level language 902 may be compiled using a first ISA compiler 904 to generate first ISA binary code 906 that may be natively executed by a processor with at least one first instruction set architecture core 916. The processor with at least one first ISA instruction set architecture core 916 represents any processor that can perform substantially the same functions as an Intel® processor with at least one first ISA instruction set architecture core by compatibly executing or otherwise processing (1) a substantial portion of the instruction set architecture of the first ISA instruction set architecture core or (2) object code versions of applications or other software targeted to run on an Intel processor with at least one first ISA instruction set architecture core, in order to achieve substantially the same result as a processor with at least one first ISA instruction set architecture core. The first ISA compiler 904 represents a compiler that is operable to generate first ISA binary code 906 (e.g., object code) that can, with or without additional linkage processing, be executed on the processor with at least one first ISA instruction set architecture core 916. Similarly, FIG. 9 shows the program in the high-level language 902 may be compiled using an alternative instruction set architecture compiler 908 to generate alternative instruction set architecture binary code 910 that may be natively executed by a processor without a first ISA instruction set architecture core 914. The instruction converter 912 is used to convert the first ISA binary code 906 into code that may be natively executed by the processor without a first ISA instruction set architecture core 914. This converted code is not necessarily to be the same as the alternative instruction set architecture binary code 910; however, the converted code will accomplish the general operation and be made up of instructions from the alternative instruction set architecture. Thus, the instruction converter 912 represents software, firmware, hardware, or a combination thereof that, through emulation, simulation, or any other process, allows a processor or other electronic device that does not have a first ISA instruction set architecture processor or core to execute the first ISA binary code 906.

In the preceding description, numerous specific details, such as component and system configurations, may be set forth in order to provide a more thorough understanding. It will be appreciated, however, by one skilled in the art, that embodiments may be practiced without such specific details. Additionally, some well-known structures, circuits, and other features have not been shown in detail, to avoid unnecessarily obscuring the description.

As used in the description and the drawings, items referred to as blocks, boxes, units, engines, etc. may represent and/or be implemented in hardware, logic gates, memory cells, circuits, circuitry, etc.

References to "one example," "an example," "one embodiment," "an embodiment," etc., indicate that the example or embodiment described may include a particular feature, structure, or characteristic, but every example or embodiment may not necessarily include the particular feature, structure, or characteristic. Moreover, such phrases are not necessarily referring to the same example or embodiment. Further, when a particular feature, structure, or characteristic is described in connection with an example or embodiment, it is submitted that it is within the knowledge of one skilled in the art to affect such feature, structure, or characteristic in connection with other examples or embodiments whether or not explicitly described.

In the various examples and embodiments described above, unless specifically noted otherwise, disjunctive language such as the phrase "at least one of A, B, or C" or "A, B, and/or C" is intended to be understood to mean either A, B, or C, or any combination thereof (i.e. A and B, A and C, B and C, and A, B and C).

As used in this description and the claims and unless otherwise specified, the use of the ordinal adjectives "first," "second," "third," etc. to describe an element merely indicates that a particular instance of an element or different instances of like elements are being referred to, and is not intended to imply that the elements so described must be in a particular sequence, either temporally, spatially, in ranking, or in any other manner. Also, as used in descriptions of embodiments, a "/" character between terms may mean that an embodiment may include or be implemented using, with, and/or according to the first term and/or the second term (and/or any other additional terms).

In this specification, operations in flow diagrams may have been described with reference to example embodiments of other figures. However, it should be understood that the operations of the flow diagrams may be performed by embodiments other than those discussed with reference to other figures, and the embodiments discussed with reference to other figures may perform operations different than those discussed with reference to flow diagrams. Furthermore, while the flow diagrams in the figures show a particular order of operations performed by certain embodiments, it should be understood that such order is provided as an example (e.g., alternative embodiments may perform the operations in a different order, combine certain operations, overlap certain operations, etc.).

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. An apparatus comprising:
a data cache;
a fill buffer;
a store buffer to store first information associated with a first retired store operation and second information associated with a second retired store operation;
a store coalescing buffer (SCB) to receive the first information from the store buffer, to store the first information in an SCB entry, to merge the second information from the store buffer into the entry, and to provide data associated with the entry for a write to the data cache in response to a cache hit or to the fill buffer in response to a cache miss;
a global store scheduler (GSS) to schedule the write relative to another write from another SCB in compliance with one or more store ordering rules; and
a global ordering buffer to order a memory write, in compliance with the one or more store ordering rules, from the fill buffer relative to another memory write from another fill buffer.

2. The apparatus of claim 1, wherein the SCB is to be associated with a slice of the data cache and the other SCB is to be associated with another slice of the data cache.

3. The apparatus of claim 2, wherein the slice is to be associated with an address range different from an address range to be associated with the other slice.

4. The apparatus of claim 1, wherein the SCB entry is to include an indicator to indicate whether the entry is eligible for merging.

5. The apparatus of claim 1, wherein the fill buffer is to be associated with a slice of the data cache and the other fill buffer is to be associated with another slice of the data cache.

6. The apparatus of claim 5, wherein the slice is to be associated with an address range different from an address range to be associated with the other slice.

7. The apparatus of claim 6, wherein the global ordering buffer includes a copy to be associated with the slice and another copy to be associated with the other slice.

8. A method comprising:
storing, in a store buffer of a processor core, first information associated with a first retired store operation;
receiving, by a store coalescing buffer (SCB) of the processor core, the first information from the store buffer;
storing, in an SCB entry, the first information;
storing, in the store buffer, second information associated with a second retired store operation;
merging the second information from the store buffer into the entry of the SCB;
providing, by the SCB, data associated with the entry for a write to a data cache or a fill buffer; and
scheduling the write relative to another write from another SCB in compliance with one or more store ordering rules; and
ordering a memory write, in compliance with the one or more store ordering rules, from the fill buffer, relative to another memory write from another fill buffer, wherein the fill buffer is associated with an address-based slice of the data cache and the other fill buffer is associated with another address-based slice of the data cache.

9. The method of claim 8, wherein the SCB is associated with an address-based slice of the data cache and the other SCB is associated with another address-based slice of the data cache.

10. The method of claim 8, further comprising:
determining whether the SCB entry is eligible for merging; and
writing to an indicator in the SCB entry to indicate whether the entry is eligible for merging.

11. The method of claim 10, wherein determining is based at least in part on whether the second retired store operation is a next immediate store in program order of the first retired store operation.

12. The method of claim 10, wherein determining is based at least in part on whether a physical address tag associated with the second retired store operation matches a physical address tag associated with the first retired store operation.

13. The method of claim 10, wherein determining is based at least in part on whether a memory type indicator associated with the second retired store operation matches a memory type indicator associated with the first retired store operation.

14. The method of claim 10, wherein scheduling the write is based at least in part on the merge indicator field.

15. The method of claim 8, further comprising determining whether the write is to the data cache or to the fill buffer.

16. A system comprising:
a processor core including:
a data cache;
a fill buffer;
a store buffer to store first information associated with a first retired store operation and second information associated with a second retired store operation;
a store coalescing buffer (SCB) to receive the first information from the store buffer, to store the first information in an SCB entry, to merge the second information from the store buffer into the entry, and to provide data associated with the entry for a write to the data cache or the fill buffer; and
a global store scheduler (GSS) to schedule the write relative to another write from another SCB in compliance with one or more store ordering rules; and
a global ordering buffer to order a memory write, in compliance with the one or more store ordering rules, from the fill buffer relative to another memory write from another fill buffer; and
a memory controller to couple the processor core to one or more memories of a system memory.

17. The system of claim 16, wherein the system memory comprises one or more dynamic random-access memories.

* * * * *